(12) United States Patent
Sone et al.

(10) Patent No.: US 8,684,849 B2
(45) Date of Patent: Apr. 1, 2014

(54) FIXED TYPE CONSTANT VELOCITY UNIVERSAL JOINT

(75) Inventors: Keisuke Sone, Iwata (JP); Hirokazu Ooba, Iwata (JP); Kazuhiko Yoshida, Iwata (JP); Kiyohiro Itou, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 13/505,763

(22) PCT Filed: Nov. 25, 2010

(86) PCT No.: PCT/JP2010/070985
§ 371 (c)(1),
(2), (4) Date: May 3, 2012

(87) PCT Pub. No.: WO2011/065400
PCT Pub. Date: Jun. 3, 2011

(65) Prior Publication Data
US 2012/0220382 A1    Aug. 30, 2012

(30) Foreign Application Priority Data

Nov. 26, 2009 (JP) ................. 2009-268907
Nov. 24, 2010 (JP) ................. 2010-261532

(51) Int. Cl.
*F16D 3/224* (2011.01)
(52) U.S. Cl.
USPC .......................................... 464/145; 464/906
(58) Field of Classification Search
USPC ........................................ 464/140, 145, 906
See application file for complete search history.

(56) References Cited

U.S. PATENT DOCUMENTS

| 4,698,047 A | 10/1987 | Welschof et al. |
| 6,120,382 A | 9/2000 | Sone et al. |

(Continued)

FOREIGN PATENT DOCUMENTS

| JP | 59-106724 | 6/1984 |
| JP | 04-228925 | 8/1992 |

(Continued)

OTHER PUBLICATIONS

International Preliminary Report on Patentability and Written Opinion of the International Searching Authority issued Jul. 19, 2012 in International (PCT) Application No. PCT/JP2010/070985.

(Continued)

*Primary Examiner* — Gregory Binda
(74) *Attorney, Agent, or Firm* — Wenderoth, Lind & Ponack, L.L.P.

(57) ABSTRACT

An eight-ball fixed type constant velocity universal joint of an undercut free type is capable of increasing a torque capacity at high operating angles while securing durability at low operating angles. When a distance between a center of a track groove and a center of a ball is denoted by Rt, and when an axial distance between the center of the track groove and a joint center plane is denoted by F, a ratio R1 of F to Rt is set to fall within a range of $0.061 \leq R1 \leq 0.087$. When a radial offset amount, which is a distance between the center of the track groove and a joint center axial line is denoted by fr, a ratio R3 of fr to Rt is set to fall within a range of $0.07 \leq R3 \leq 0.19$. When an effective cured-layer depth with Hv 513 is denoted by Di and the diameter of the ball is denoted by d, a bottom surface of a track groove of an inner joint member includes a cured layer with an effective cured-layer depth ratio Di/d of at least 0.111 or more.

7 Claims, 12 Drawing Sheets

(56) References Cited

U.S. PATENT DOCUMENTS

| | | |
|---|---|---|
| 6,383,082 B1 | 5/2002 | Déclas |
| 2006/0217207 A1 | 9/2006 | Hoshino et al. |
| 2011/0003645 A1 | 1/2011 | Ooba et al. |
| 2011/0065519 A1* | 3/2011 | Sone et al. .................... 464/145 |

FOREIGN PATENT DOCUMENTS

| | | |
|---|---|---|
| JP | 08-128454 | 5/1996 |
| JP | 9-317783 | 12/1997 |
| JP | 2001-097063 | 4/2001 |
| JP | 2002-541395 | 12/2002 |
| JP | 2007-24106 | 2/2007 |
| JP | 2007-255461 | 10/2007 |
| JP | 2007-270997 | 10/2007 |
| JP | 2009-121673 | 6/2009 |

OTHER PUBLICATIONS

International Search Report issued Jan. 18, 2011 in International (PCT) Application No. PCT/JP2010/070985.

* cited by examiner

CENTER OF SPHERICAL OUTER SURFACE

FIXED TYPE CONSTANT VELOCITY UNIVERSAL JOINT

TECHNICAL FIELD

The present invention relates to a fixed type constant velocity universal joint, in particular, a fixed type constant velocity universal joint of a type allowing only angular displacement between two shafts on a driving side and a driven side, which are coupled to each other. More particularly, the present invention relates to a fixed type constant velocity universal joint of an undercut free type, which comprises eight torque transmitting balls and is to be used in a power transmission system for automobiles and various industrial machines.

BACKGROUND ART

Examples of a fixed type constant velocity universal joint comprise a fixed type constant velocity universal joint of a Rzeppa type (BJ) (for example, Patent Literature 1) and a fixed type constant velocity universal joint of the undercut free type (UJ).

As illustrated in FIG. 17, the fixed type constant velocity universal joint of the Rzeppa type comprises: an outer joint member 3 having a spherical inner surface 1 in which a plurality of track grooves 2 are equiangularly formed along an axial direction; an inner joint member 6 having a spherical outer surface 4 in which a plurality of track grooves 5 paired with the track grooves 2 of the outer joint member 3 are equiangularly formed along the axial direction; a plurality of balls 7 for transmitting torque, which are interposed between the track grooves 2 of the outer joint member 3 and the track grooves 5 of the inner joint member 6; and a cage 8 for holding the balls 7, which is interposed between the spherical inner surface 1 of the outer joint member 3 and the spherical outer surface 4 of the inner joint member 6. The cage 8 is provided with a plurality of circumferential window portions 9 for accommodating the balls 7.

The cage 8 is held in spherical contact with both the spherical inner surface of the outer joint member 3 and the spherical outer surface of the inner joint member 6. Curvature centers (O2 and O1) of ball-center trace lines of the track grooves 2 and 5 of the outer joint member 3 and the inner joint member 6 are positioned symmetrically with each other with respect to a joint center Oj. In other words, the curvature center O1 and the curvature center O2 are axially offset to each other in opposite directions and by equal distances from the joint center Oj. Specifically, the track groove 2 of the outer joint member 3 is offset from a joint center Oj to a joint opening side by a predetermined distance along a joint center axial line X, and the track groove 5 of the inner joint member 6 is offset from the joint center Oj to a joint deep side by the predetermined distance along the joint center axial line X. Here, the joint center axial line X refers to a straight line comprising an axial line of the outer joint member 3 and an axial line of the inner joint member 6 under a state in which an operating angle of the joint is 0°. A joint center plane refers to a plane which comprises centers of the torque transmitting balls 7 and is orthogonal to the joint center axial line. The joint center Oj refers to an intersection of the joint center plane and the joint center axial line.

Thus, ball tracks formed of the track grooves 2 of the outer joint member 3 and the track grooves 5 of the inner joint member 6 each have a wedge-like shape gradually expanding from one axial side to another axial side. The balls 7 are accommodated respectively in the wedge-like ball tracks, and transmit torque between the outer joint member 3 and the inner joint member 6. The cage 8 is incorporated to hold all the balls 7 within a joint plane (plane perpendicular to a bisector of an operating angle).

Further, a structure of the fixed type constant velocity universal joints of the Rzeppa type, which has been used as a technical standard for many years, has six torque transmitting balls, and this structure has gained support from many users in terms of performance, reliability, and the like. In this context, the applicants of the present invention have developed and already suggested an eight-ball Rzeppa joint which has high efficiency and is drastically reduced in weight and compactified while securing strength, load capacity, and durability which are equivalent to or higher than those of the six-ball Rzeppa joint as the technical standard (for example, Patent Literature 1 below).

Next, as illustrated in FIG. 18, the fixed type constant velocity universal joint of the UJ type comprises: an outer joint member 13 having an inner surface 11 in which a plurality of track grooves 12 are equiangularly formed along an axial direction; an inner joint member 16 having an outer surface 14 in which a plurality of track grooves 15 paired with the track grooves 12 of the outer joint member 13 are equiangularly formed along the axial direction; a plurality of balls 17 for transmitting torque, which are interposed between the track grooves 12 of the outer joint member 13 and the track grooves 15 of the inner joint member 16; and a cage 18 for holding the balls 17, which is interposed between the inner surface 11 of the outer joint member 13 and the outer surface 14 of the inner joint member 16. The cage 18 is circumferentially provided with a plurality of window portions 19 for accommodating the balls 17.

In this case, each of the track grooves 12 of the outer joint member 13 is formed of a deep-side track groove 12a in which a circular arc portion is formed along a track-groove ball-center trace line, and an opening-side track groove 12b in which a straight portion parallel with an axial line of the outer joint member is formed along the track-groove ball-center trace line. A curvature center O2 of the deep-side track groove 12a is shifted in an axial direction from a joint center Oj to an opening side of the outer joint member 13. Further, each of the track grooves 15 of the inner joint member 16 is formed of a deep-side track groove 15a in which a straight portion parallel with an axial line of the inner joint member is formed along the track-groove ball-center trace line, and an opening-side track groove 15b in which a circular arc portion is formed along the track-groove ball-center trace line. A curvature center O1 of the opening-side track groove 15b is provided apart by an equal distance F in the axial direction from the joint center Oj to a deep side opposite to the curvature center O2 of the deep-side track groove 12a of the outer joint member 13.

As described above, in contrast to the Rzeppa type in which each of the tracks is formed into a circular arc shape as a whole, a track shape of the outer joint member 13 of the UJ type is undercut free, specifically, straight on the opening side. Thus, in the opening portion, the balls are positioned on an outer side than those in the BJ type. With this, a shaft (shaft to be fitted into the inner joint member) and the track grooves 12 of the outer joint member 13 interfere with each other at higher angles. As a result, an operating angle that can be formed in the UJ type is higher than that in the BJ type. Further, the track shape of the outer joint member 13 of the UJ type is straight on the opening side. Thus, a radial moving amount of the balls 17 increases in an outer direction, and in accordance therewith, it is necessary to set an outer diameter of the cage 18 for holding the balls 17 to be larger. Therefore, a spherical inner diameter of the outer joint member 13 increases.

However, in the UJ type, the inner surface (spherical inner surface) of the outer joint member 13 is large, and hence the circular arc track groove of the outer joint member 13 is offset to the opening side. As a result, a track depth on the deep side decreases. Therefore, when the spherical inner surface of the outer joint member 13 is increased as described above, the track groove depth on the deep side further decreases. Here, the track depth is expressed as a distance from a ball contact point to a spherical surface, the distance being measured at a position at which a contact ellipse of the ball, which moves in the track into the axial direction and directions of contact angles, comes closest to a spherical surface during one rotation based on results of analysis on a joint internal force in a rotational state.

Further, with regard to holding of the balls 7 and 17 respectively with the cages 8 and 18 and securing of the track depths, a ball diameter in the UJ type is set to be larger than that in the Rzeppa type of the same size. In addition, a pitch circle diameter PCD of the ball, and in accordance therewith, an outer diameter of the outer joint member are set to be larger.

The fixed type constant velocity universal joint of the UJ type illustrated in FIG. 18 has a cage offset shape advantageous in securing the track depth on the deep side of the outer joint member. Specifically, a center O4 of a spherical outer surface 18a of the cage 18 is offset toward an axial opening side by fc with respect to the joint center Oj, and a center O3 of a spherical inner surface 18b of the cage 18 is offset toward an axial deep side by fc. The cage offset of such a type is referred to as track direction cage offset.

In recent years, there has also been proposed an eight-ball joint of the UJ type, which has a smaller outer diameter than that of the six-ball type (Patent Literature 1). A ball diameter of the eight-ball joint of the UJ type is smaller than that of the six-ball type. Thus, an offset amount is set to be small so that a radial dimension (thickness) of the cage, which corresponds to the above-mentioned radial moving amount determined based on a PCR (length of a segment connecting a center of a circular arc of the track groove of the outer joint member or a center of a circular arc of the track groove of the inner joint member and a center of the ball to each other) and based on an offset amount, can be secured irrespective of the size and the number of balls. In addition, as illustrated in FIG. 18, the eight-ball joint of the UJ type employs the cage offset.

In this context, higher strength and durability at high angles are important factors in terms of further compactification of such an eight-ball joint of the UJ type.

By the way, conventionally, there have been proposed constant velocity joints of a six-ball Rzeppa type, in which a center of the track groove is offset to a position spaced apart from the joint center axial line toward a radially opposite side with respect to the track groove (Patent Literatures 2, 3, and 4).

According to Patent Literature 2, the track groove of the outer joint member is formed of an opening-side first guide groove about the joint center and a deep-side first guide groove about a point offset from the joint center toward a radially opposite side. Further, the track groove of the inner joint member is formed of a deep-side second guide groove about a point offset from the joint center toward the deep side along the joint center axial line and an opening-side second guide groove about a point offset from the center of the deep-side second guide groove further toward the radially opposite side.

With such a structure, a groove depth of the deep-side first guide groove of the outer joint member is large, and a thickness of the inner joint member is large at a part corresponding to the opening-side second guide groove of the inner joint member. Thus, even when the joint forms a high operating angle, the ball does not climb onto the deep-side first guide groove of the outer joint member, and hence does not chip an edge part of the deep-side first guide groove. In addition, the inner joint member is not damaged by load from the ball.

According to Patent Literature 3, the center of the track groove of the outer joint member and the center of the track groove of the inner joint member are respectively offset to positions spaced apart from a diametric plane (joint center plane) toward both axial sides by equal distances and spaced apart from the joint center axial line toward radially opposite sides by predetermined amounts. With such a structure, under a state in which the joint forms a maximum operating angle and the balls come extremely close to an inlet edge portion of the track groove of the outer joint member, a contact force of the ball and the track groove is reduced. As a result, the inlet edge portion of the track groove is prevented from being damaged.

According to Patent Literature 4, respective curvature centers of groove center lines of the track groove of the outer joint member and the track groove of the inner joint member are set to be decentered toward both sides with respect to the joint center plane and to be positioned on opposite sides beyond an axial center on a plane comprising the groove center lines and the axial center. With this, a maximum permissible angle of a joint angle can be increased, and strength is secured without involving an increase in outer diameter of the outer joint member.

Further, conventionally, there has been proposed a joint capable of increasing a maximum bending angle without influence on traveling characteristics or the like (Patent Literature 5). Specifically, according to Patent Literature 5, an intersection angle between a tangent of a trace curve and a joint rotational axial line monotonically increases from a point at which a maximum distance between a base of a rolling path and the joint rotational axial line is measured.

CITATION LIST

Patent Literature

Patent Literature 1: JP 9-317783 A
Patent Literature 2: JP 4-228925 A
Patent Literature 3: JP 2002-541395 A
Patent Literature 4: JP 8-128454 A
Patent Literature 5: JP 59-106724 A

SUMMARY OF INVENTION

Technical Problem

In the constant velocity universal joint of the Rzeppa type, when an axial offset amount of the center of the track groove (axial distance between the center of the track groove and the joint center plane) is reduced, or when a radial offset amount (radial distance between the center of the track groove and the joint center axial line) is secured, a peak value of track load during rotation of the joint (load to act on a contact portion between the torque transmitting ball and the track groove) tends to increase. In this context, the center of the track groove in each of the six-ball Rzeppa joints according to Patent Literatures 2 and 3 is radially offset in consideration of prevention of damage on side wall parts of the track groove at a maximum operating angle or in a high operating angle range therearound. In other words, an object of securing durability in a low operating angle range and an intermediate operating angle range is not taken into consideration at all.

In particular, each of the above-mentioned constant velocity joints described in Patent Literatures 2 to 4 comprises six balls and track grooves each formed of a single circular arc portion. Further, the synchronous rotary joint described in Patent Literature 5 also comprises six balls, and the track groove is free from a straight portion. Thus, there has not conventionally existed an eight-ball constant velocity universal joint of the UJ type, which is capable of increasing a torque capacity at high operating angles while securing durability at low operating angles.

It is an object of the present invention to provide an eight-ball fixed type constant velocity universal joint of the undercut free type, which is capable of increasing a torque capacity at high operating angles while securing durability at low operating angles.

Solution to Problem

The present invention provides a first fixed type constant velocity universal joint, comprising: an outer joint member having an inner surface in which eight track grooves extending in an axial direction are formed; an inner joint member having an outer surface in which eight track grooves extending in the axial direction are formed; eight ball tracks formed by cooperation of the eight track grooves of the outer joint member and the eight track grooves of the inner joint member corresponding to the eight track grooves of the outer joint member; eight torque transmitting balls arranged respectively in the eight ball tracks; and a cage comprising pockets for respectively holding the eight torque transmitting balls, the fixed type constant velocity universal joint comprising an undercut free type fixed type constant velocity universal joint, in which a bottom surface of each of the eight track grooves of the outer joint member and a bottom surface of each of the eight track grooves of the inner joint member each comprise a curved portion and a straight portion, wherein, under a state in which an operating angle of the fixed type constant velocity universal joint is 0°, when a straight line comprising an axial line of the outer joint member and an axial line of the inner joint member is defined as a joint center axial line, and when a plane which comprises respective centers of the eight torque transmitting balls and is orthogonal to the joint center axial line is defined as a joint center plane, a center of each of the eight track grooves of the outer joint member and a center of each of the eight track grooves of the inner joint member are offset respectively to positions spaced apart from the joint center plane respectively toward both axial sides and spaced apart from the joint center axial line respectively toward radially opposite sides with respect to corresponding one of the eight track grooves of the outer joint member and corresponding one of the eight track grooves of the inner joint member, respectively, wherein a center of a spherical outer surface of the cage and a center of a spherical inner surface of the cage match each other, wherein, when a distance between the center of each of the eight track grooves of the outer joint member or the center of each of the eight track grooves of the inner joint member and the center of corresponding one of the eight torque transmitting balls is denoted by Rt, and when an axial distance between the center of each of the eight track grooves of the outer joint member or the center of each of the eight track grooves of the inner joint member and the joint center plane is denoted by F, a ratio R1 of F to Rt (=F/Rt) falls within a range of $0.061 \leq R1 \leq 0.087$, wherein, when a radial offset amount, which is a distance from the center of each of the eight track grooves of the outer joint member or the center of each of the eight track grooves of the inner joint member to the joint center axial line, is denoted by fr, a ratio R3 of fr to Rt (=fr/Rt) falls within a range of $0.07 \leq R3 \leq 0.19$, and wherein, when an effective cured-layer depth with Hv 513 is denoted by Di and a diameter of each of the eight torque transmitting balls is denoted by d, the bottom surface of each of the eight track grooves of the inner joint member comprises a cured layer with an effective cured-layer depth ratio Di/d of at least 0.111 or more.

The present invention provides a second fixed type constant velocity universal joint, comprising: an outer joint member having an inner surface in which eight track grooves extending in an axial direction are formed; an inner joint member having an outer surface in which eight track grooves extending in the axial direction are formed; eight ball tracks formed by cooperation of the eight track grooves of the outer joint member and the eight track grooves of the inner joint member corresponding to the eight track grooves of the outer joint member; eight torque transmitting balls arranged respectively in the eight ball tracks; and a cage comprising pockets for respectively holding the eight torque transmitting balls, the fixed type constant velocity universal joint comprising an undercut free type fixed type constant velocity universal joint, in which a bottom surface of each of the eight track grooves of the outer joint member and a bottom surface of each of the eight track grooves of the inner joint member each comprise a curved portion and a straight portion, wherein, under a state in which an operating angle of the fixed type constant velocity universal joint is 0°, when a straight line comprising an axial line of the outer joint member and an axial line of the inner joint member is defined as a joint center axial line, and when a plane which comprises respective centers of the eight torque transmitting balls and is orthogonal to the joint center axial line is defined as a joint center plane, a center of each of the eight track grooves of the outer joint member and a center of each of the eight track grooves of the inner joint member are offset respectively to positions spaced apart from the joint center plane respectively toward both axial sides and spaced apart from the joint center axial line respectively toward radially opposite sides with respect to corresponding one of the eight track grooves of the outer joint member and corresponding one of the eight track grooves of the inner joint member, respectively, wherein a center of a spherical outer surface of the cage is arranged on the center side of each of the eight track grooves of the inner joint member with respect to the joint center plane, wherein a center of a spherical inner surface of the cage is arranged on the center side of each of the eight track grooves of the outer joint member with respect to the joint center plane, wherein, when an axial distance from the center of the spherical outer surface of the cage or the center of the spherical inner surface of the cage to the joint center plane is denoted by fc, and when a distance from the center of corresponding one of the eight torque transmitting balls to the joint center axial line is denoted by R, a ratio R2 of fc to R (=fc/R) is 0.01 or less, wherein, when a distance between the center of each of the eight track grooves of the outer joint member or the center of each of the eight track grooves of the inner joint member and the center of corresponding one of the eight torque transmitting balls is denoted by Rt, and when an axial distance between the center of each of the eight track grooves of the outer joint member or the center of each of the eight track grooves of the inner joint member and the joint center plane is denoted by F, a ratio R1 of F to Rt (=F/Rt) falls within a range of $0.044 \leq R1 \leq 0.087$, wherein, when a radial offset amount, which is a distance from the center of each of the eight track grooves of the outer joint member or the center of each of the eight track grooves of the inner joint member to the joint center axial line, is denoted by fr, a ratio R3 of fr to Rt (=fr/Rt) falls within a range of 0.07≤R3≤0.19, and wherein, when an effective cured-layer depth with Hv 513 is denoted by Di and a diameter of each of the eight torque transmitting balls is denoted by d, the bottom surface of each of the eight track grooves and the inner surface of the inner joint member comprise cured layers with an effective cured-layer depth ratio Di/d of at least 0.111 or more.

At a normal angle (operating angle of 6°), a track depth increases as the R1 value becomes smaller, and the track depth increases as the R3 value becomes smaller. Here, the track depth refers to a distance from a ball contact point to a spherical surface, the distance being measured at a position at which a contact ellipse of each of the eight torque transmitting balls, which move respectively in the eight ball tracks into the axial direction and directions of contact angles, comes closest to a spherical surface during one rotation based on results of analysis on a joint internal force in a rotational state. Durability is enhanced as the distance from the ball contact point to the spherical surface is larger.

The center of each of the eight track grooves of the outer joint member (curvature center of the curved portion) is radially offset. With this, in comparison with a case where the radial offset is provided, the groove depth of a part of each of the eight track grooves of the outer joint member on the joint deep portion side is relatively large, and hence rigidity of a wall portion of each of the eight track grooves of the outer joint member on the joint deep portion side increases. Therefore, when the fixed type constant velocity universal joint forms a high operating angle and each of the eight torque transmitting balls transmits torque at a position of each of the eight track grooves of the outer joint member on the joint deep portion side, an edge part of the wall portion of each of the eight track grooves of the outer joint member on the joint deep portion side is suppressed from being deformed. As a result, a torsional strength of the fixed type constant velocity universal joint in a high operating angle range is enhanced. Further, a torque capacity in the high operating angle range increases, and hence edge load on the wall portion of each of the eight track grooves of the outer joint member on the joint deep portion side decreases. As a result, durability of the fixed type constant velocity universal joint in the high operating angle range is enhanced. Here, the torque capacity refers to torque which causes an end portion of the contact ellipse formed of a contact portion between each of the eight torque transmitting balls and corresponding one of the eight track grooves of the outer joint member to overlap an edge line of the corresponding one of the eight track grooves of the outer joint member when the fixed type constant velocity universal joint transmits torque at a certain operating angle.

Further, by setting R2 to 0.01 or less, a thickness of the cage on the opening side is prevented from decreasing. A PV value (obtained by multiplying a skidding speed between one of the eight torque transmitting balls and corresponding one of the eight track grooves by the track load) decreases as the R1 value becomes smaller. Durability is enhanced as the PV value becomes smaller. When the effective cured-layer depth with Hv 513 is denoted by Di and the diameter of each of the eight torque transmitting balls is denoted by d, the bottom surface (groove inner surface) of each of the eight track grooves of the inner joint member has the effective cured-layer depth ratio Di/d of at least 0.111 or more. Thus, rigidity of edge portions of track shoulder portions of the inner joint member is enhanced. In particular, strength and durability at high angles of the straight groove portion having a small track depth are enhanced.

It is preferred that the ratio R1 of F to Rt (=F/Rt) be set to 0.071 or less and the ratio R3 of fr to Rt (=fr/Rt) be to 0.15 or more.

It is preferred that, when an effective cured-layer depth with Hv 600 is denoted by Dc and the diameter of each of the eight torque transmitting ball is denoted by d, the cage have an effective cured-layer depth ratio Dc/d of at least 0.067 or more, and have an ungrinded surface free from a soft layer having hardness smaller than hardness of a surface of a grinded portion.

It is preferred that, along an opening end of the inner surface of the outer joint member, cut portions for inserting the cage be provided at at least two points symmetrical with each other with respect to an axial center. At this time, it is preferred that the cut portions be formed by cold forging.

It is preferred that the outer joint member comprise a mouth portion provided with the eight track grooves, the mouth portion comprising a chamfer for allowing formation of an operating angle, the chamfer radially expanding toward an opening side of the outer joint member and being formed at an opening end portion of the mouth portion. Further, it is preferred that, when a projecting amount of the opening end portion of the mouth portion from an intersection of the chamfer and a groove bottom of corresponding one of the eight track grooves of the outer joint member is denoted by t, and when the diameter of each of the eight torque transmitting ball is denoted by d, a relationship of t=0.13 d to 0.185 d be satisfied, and an uncured layer that has not undergone curing treatment exist from the opening end surface of the mouth portion to an outer peripheral surface of the mouth portion, which is continuous with the opening end surface.

The constant velocity universal joint is used for coupling of a drive shaft of an automobile.

Advantageous Effects of Invention

In the constant velocity universal joint of the present invention, the torque capacity increases on the deep side of the outer joint member at high operating angles. Thus, rigidity of a wall surface of the track groove is enhanced. As a result, the track edge portions are suppressed from being deformed, and hence torsional strength is enhanced. In addition, the track depth increases on the deep side of the outer joint member at high operating angles. Thus, a climb-up torque increases and the edge load decreases, with the result that durability at high operating angles is enhanced.

At a normal angle (operating angle of 6°), the track depth equivalent to that of the conventional product can be secured, and durability is equivalent to or higher than that of the conventional product. In particular, when R1=0.071 or less is established, the track depth increases and the PV value decreases, and hence durability is enhanced. As described above, the fixed type constant velocity universal joint is capable of satisfying demand for high durability, and hence downsizing, weight reduction, and cost reduction can be achieved. Further, when the PV value is set to be smaller than that of the conventional product by establishing R1=0.087 or less, axial load from the balls to the cage and radial moving amounts of the balls decrease. As a result, torque transmission efficiency is enhanced.

Further, on the premise that the effective cured-layer depth with Hv 513 is denoted by Di and the diameter of the ball is denoted by d, when the effective cured-layer depth ratio Di/d of the inner joint member is at least 0.111 or more, rigidity of the edge portions of the track shoulder portions of the inner joint member is enhanced. Thus, local deformation is suppressed, with the result that strength and durability are enhanced.

When the cut portions for inserting the cage are provided at two points at the opening end of the inner surface of the outer joint member, a contact surface which holds the spherical outer surface of the cage can be enlarged toward the opening side. With this, the cage under high load can be suppressed from being deformed. Therefore, torsional fatigue strength or quasi-static torsional strength at high operating angles of the joint as a whole can be enhanced.

When t=0.13 d to 0.185 d is satisfied so that a projecting portion on the opening side of the mouth portion of the outer joint member is elongated, rigidity of the opening portion increases, and hence strength is enhanced. Further, when the uncured layer is increased, deformation in heat treatment for forming the cured layer can be suppressed.

As described above, according to the present invention, it is possible to provide a compact fixed type constant velocity universal joint excellent in joint strength. Thus, the fixed type constant velocity universal joint according to the present invention is best suited for a drive shaft.

DESCRIPTION OF EMBODIMENTS

In the following, description is made of embodiments of the present invention with reference to the drawings.

Figure 1:
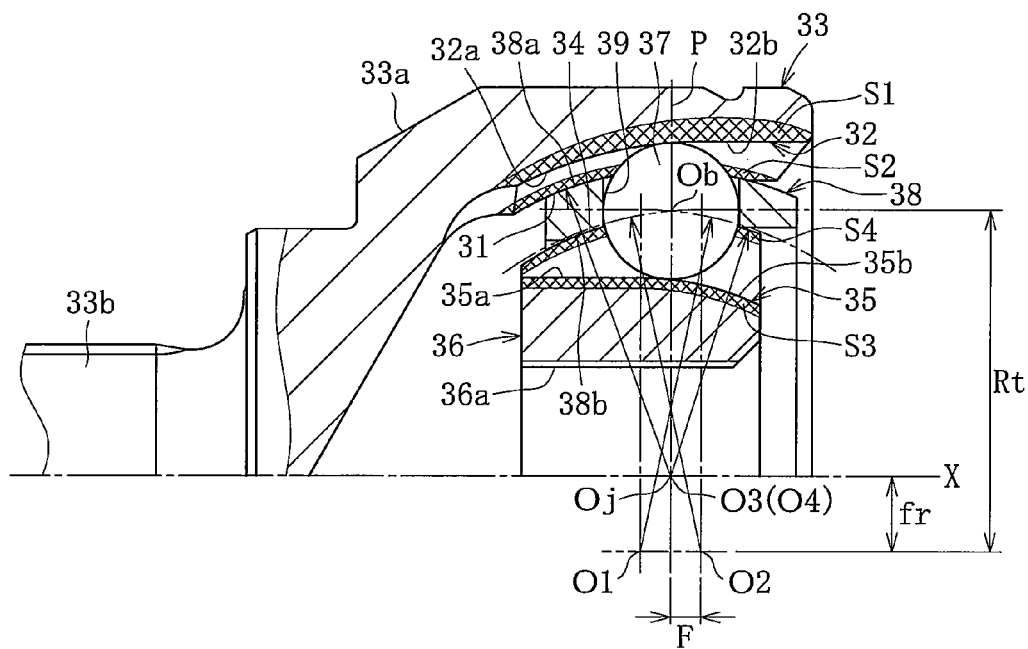
FIG. 1 A sectional view of a fixed type constant velocity universal joint according to a first embodiment of the present invention.
Figure 2:
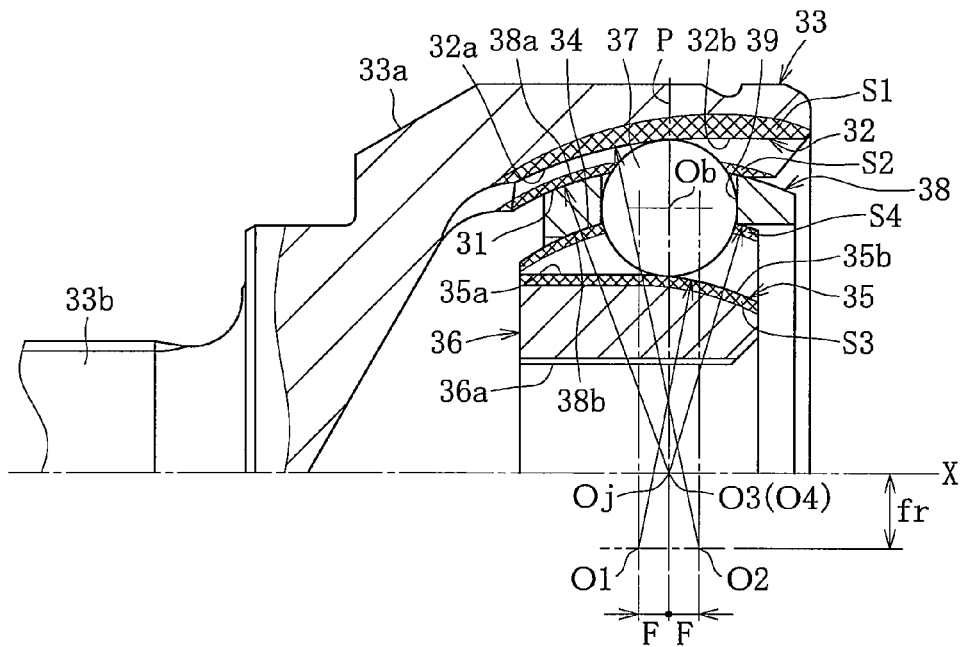
FIG. 2 Another sectional view of the fixed type constant velocity universal joint.

A fixed type constant velocity universal joint according to this embodiment is arranged on, for example, a fixation side (wheel side) of a drive shaft for automobiles. As illustrated in FIGS. 1 and 2, the fixed type constant velocity universal joint comprises: an outer joint member 33 having an inner surface (spherical inner surface) 31 in which a plurality of (eight) track grooves 32 are equiangularly formed along an axial direction; an inner joint member 36 having an outer surface 34 in which a plurality of (eight) track grooves 35 paired with the track grooves 32 of the outer joint member 33 are equi-angularly formed along the axial direction; eight torque transmitting balls 37 arranged respectively in eight ball tracks formed by cooperation of the track grooves 32 of the outer joint member 33 and the track grooves 35 of the inner joint member 36; and a cage 38 for holding the balls 37, which is interposed between the inner surface 31 of the outer joint member 33 and the outer surface (spherical outer surface) 34 of the inner joint member 36. The cage 38 is provided with a plurality of circumferential window portions 39 for accommodating the balls 37. Note that, a toothprofile (serrations or splines) 36a for coupling a shaft portion is formed along an inner surface of the inner joint member 36.

The outer joint member 33 comprises a mouth portion 33a having the track grooves 32, and a shaft portion 33b projected from a bottom wall of the mouth portion 33a. Each of the track grooves 32 of the mouth portion 33a is formed of a deep-side track groove 32a in which a curved portion (circular arc portion) is formed along a track-groove ball-center trace line, and an opening-side track groove 32b in which a straight portion parallel with an axial line of the outer joint member is formed along the track-groove ball-center trace line. Further, each of the track grooves 35 of the inner joint member 36 is formed of a deep-side track groove 35a in which a straight portion parallel with an axial line of the inner joint member is formed along the track-groove ball-center trace line, and an opening-side track groove 35b in which a curved portion (circular arc portion) is formed along the track-groove ball-center trace line.

Figure 3:
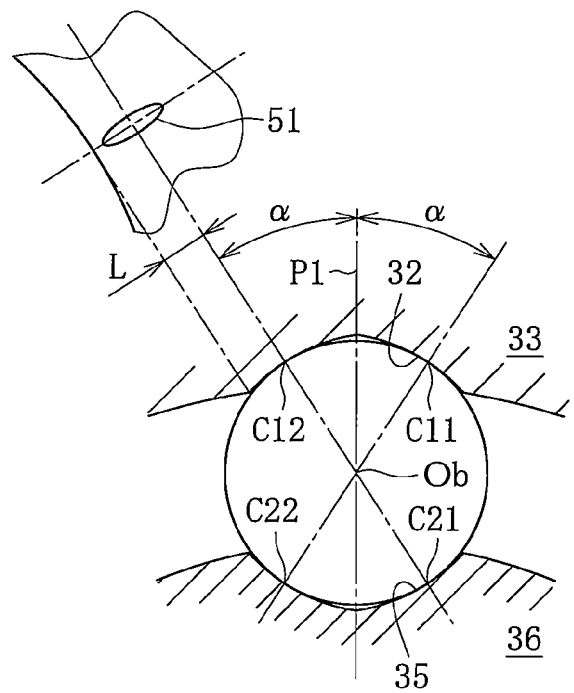
FIG. 3 An explanatory view illustrating a shape of a track groove of the fixed type constant velocity universal joint.

The track grooves 32 of the outer joint member 33 and the track grooves 35 of the inner joint member 36 are each formed into a Gothic arch shape through a forging process alone, a trimming process after the forging process, or the like. As illustrated in FIG. 3, through employment of the Gothic arch shape, the track grooves 32 and 35 and the balls 37 are held in angular contact with each other. Specifically, each of the balls 37 is formed to be held in contact with the track groove 32 of the outer joint member 33 at two points C11 and C12, and held in contact with the track groove 35 of the inner joint member 36 at two points C21 and C22. Contact angles α refer to angles formed between the center Ob of the ball 37 and the contact points C11 and C12 at which the ball 37 is held in contact with the track groove 32 and between the center Ob of the ball 37 and the contact points C21 and C22 at which the ball 37 is held in contact with the track groove 35 with respect to a segment P1 passing a center Ob of the ball 37 and a joint center Oj.

FIGS. 1 and 2 illustrate a state in which an operating angle θ of the joint is 0°. In this state, the axial line of the outer joint member 33 and the axial line of the inner joint member 36 match each other on a straight line X. Further, a plane P comprising the centers Ob of all the torque transmitting balls 37 is orthogonal to the straight line X. In the following, the straight line X is referred to as a joint center axial line X, the plane P is referred to as a joint center plane P, and an intersection of the joint center plane P and the joint center axial line X is referred to as the joint center Oj.

As illustrated in FIG. 2, a center (curvature center) O2 of the deep-side track groove 32a of the track groove 32 of the outer joint member 33 is offset to a position spaced apart from the joint center plane P toward a joint opening side (right side of FIG. 2) by an axial distance F and spaced apart from the joint center axial line X toward a radially opposite side with respect to the track groove 32 by a radial distance fr. Further, a center O1 of the opening-side track groove 35b of the track groove 35 of the inner joint member 36 is offset to a position spaced apart from the joint center plane P toward a joint deep portion side (left side of FIG. 2) by the axial distance F and spaced apart from the joint center axial line X toward the radially opposite side with respect to the track groove 35 by the radial distance fr.

In the following, the axial distance (F) between the respective centers O2 and O1 of the track grooves 32 and 35 and the joint center plane P is referred to as an axial offset amount F, and the radial distance (fr) between the respective curvature centers O2 and O1 and the joint center axial line X is referred to as a radial offset amount fr. Note that, in this embodiment, the track groove 32 of the outer joint member 33 and the track groove 35 of the inner joint member 36 have the same axial offset amount F and the same radial offset amount fr.

Further, in this embodiment, both a center O4 of a spherical outer surface 38a of the cage 38 and a center O3 of a spherical inner surface 38b of the cage 38 exist on the joint center Oj.

As illustrated in FIG. 1, when a distance between the center (curvature center) O2 of the track groove 32 of the outer joint member 33 or the center (curvature center) O1 of the track groove 35 of the inner joint member 36 and the center Ob of the torque transmitting ball 37 is denoted by Rt, and when the axial distance (above-mentioned axial offset amount) between the center O2 of the track groove 32 of the outer joint member 33 or the center O1 of the track groove 35 of the inner joint member 36 and the joint center plane P is denoted by F, a ratio R1 of F to Rt (=F/Rt) is set to fall within a range of $0.061 \leq R1 \leq 0.087$. Thus, R1 can be referred to as a value representing a degree of the offset (axial offset).

Further, when the distance between the center (curvature center) O2 of the track groove 32 of the outer joint member 33 or the center (curvature center) O1 of the track groove 35 of the inner joint member 36 and the joint center axial line X, that is, the radial offset amount is denoted by fr, a ratio R3 of fr to Rt (=fr/Rt) is set to fall within a range of $0.07 \leq R3 \leq 0.19$. Thus, R3 can be referred to as a value representing a degree of the offset (radial offset).

Figure 4:
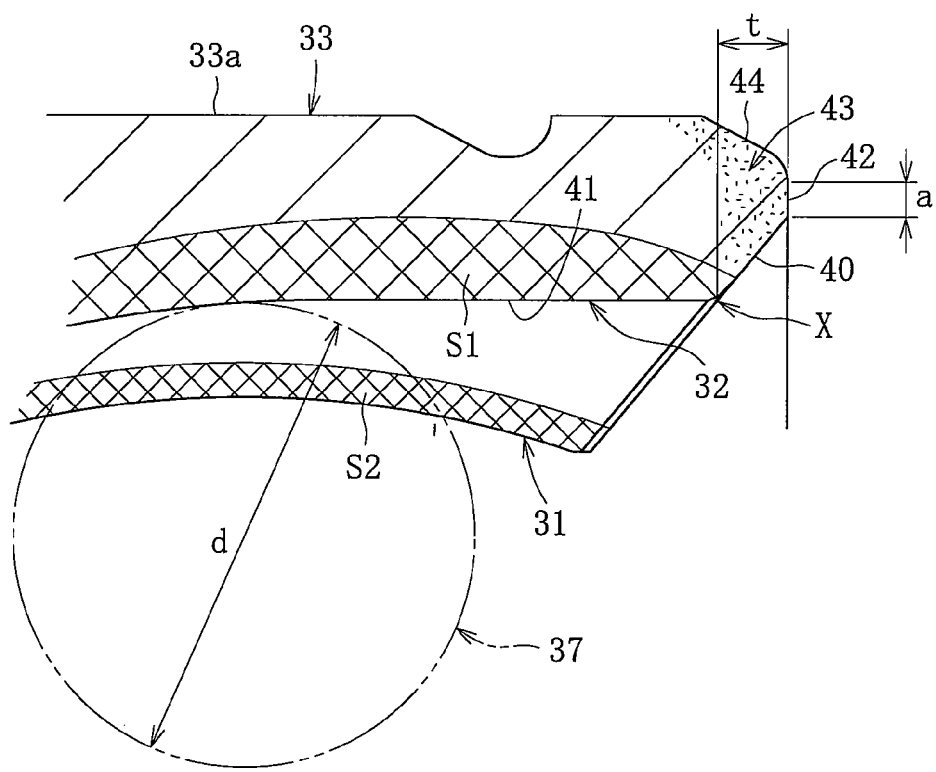
FIG. 4 A main-part enlarged explanatory view illustrating an outer joint member of the fixed type constant velocity universal joint.

By the way, as illustrated in FIG. 4, cured layers S2 and S1 are provided respectively on the inner surface 31 of the mouth portion 33a and a groove bottom 41 of the track groove 32 of the outer joint member 33. The outer joint member 33 is made, for example, of a carbon steel with a carbon content of from 0.46 mass % to 0.58 mass %, and undergoes a cold-forging process at least once. Hardness on an outer peripheral side of the mouth portion 33a (hardness of parts other than the cured layers) is set to Hv (Vickers hardness) 280 or more to Hv 400 or less, and hardness of the cured layers is set to Hv 500 or more and Hv 780 or less. This is because, when the Vickers hardness is less than Hv 500, an amount of undissolved ferrite in a slack-quenched structure increases, with the result that static torsional strength sharply decreases. Note that, an upper limit of the hardness of the cured layers is determined by martensite hardness in accordance with the carbon content of the carbon steel. Various heat treatments such as induction hardening and carburizing-and-quenching can be employed for forming the cured layers S1 and S2. The induction hardening refers to a quenching method in which a part required to be quenched is inserted into a coil carrying a high-frequency current, and which applies a principle that, with an electromagnetic induction action, Joule heat is generated to heat a conductive body. The carburizing-and-quenching refers to a method of causing carbon to intrude/spread from a surface of a low carbon material and then performing quenching of the material.

As illustrated in FIG. 4, a chamfer 40 for allowing formation of the operating angle, which radially expands toward the opening side, is formed at an opening end portion of the mouth portion 33a. In this case, when a projecting amount of an opening end surface 42 of the mouth portion 33a from an intersection X of the chamfer 40 and the groove bottom 41 of the track groove 32 (projecting amount of a projecting portion 43) is denoted by t, and when a diameter of the ball 37 is denoted by d, the chamfer 40 is configured such that a relationship of $t=0.13 d$ to $0.185 d$ is satisfied. Further, an uncured layer 44 that has not undergone curing treatment exists from the opening end surface 42 of the mouth portion 33a to an outer peripheral surface of the mouth portion 33a, which is continuous with the opening end surface 42.

As illustrated in FIG. 2, cured layers S4 and S3 are provided respectively on the outer surface 34 and a groove bottom 45 of the track groove 35 of the inner joint member 36. The inner joint member 36 can be made of a raw material such as SCr420. When an effective cured-layer depth with Hv 513 is denoted by Di and a diameter of the ball is denoted by d, an effective cured-layer depth ratio Di/d of each of the cured layers S3 and S4 in this case is at least 0.111 or more. Here, the effective cured-layer depth refers to a distance from a surface of the cured layer to a position at which defined limit hardness is measured. Therefore, the defined limit hardness in this case is Hv 513, and Di/d of the cured layer is at least 0.111 or more when a dimension from the surface of the cured layer to the position at which this hardness is measured is denoted by Di and when the diameter of the ball is denoted by d. Various heat treatments such as induction hardening and carburizing-and-quenching can be employed for forming the cured layers S3 and S4. Note that, an upper limit of the effective cured-layer depth can be arbitrarily set based on a thickness of the mouth portion 33a of the outer joint member 33 and hardness of the uncured portion as long as strength of the mouth is not deteriorated.

Figure 5:
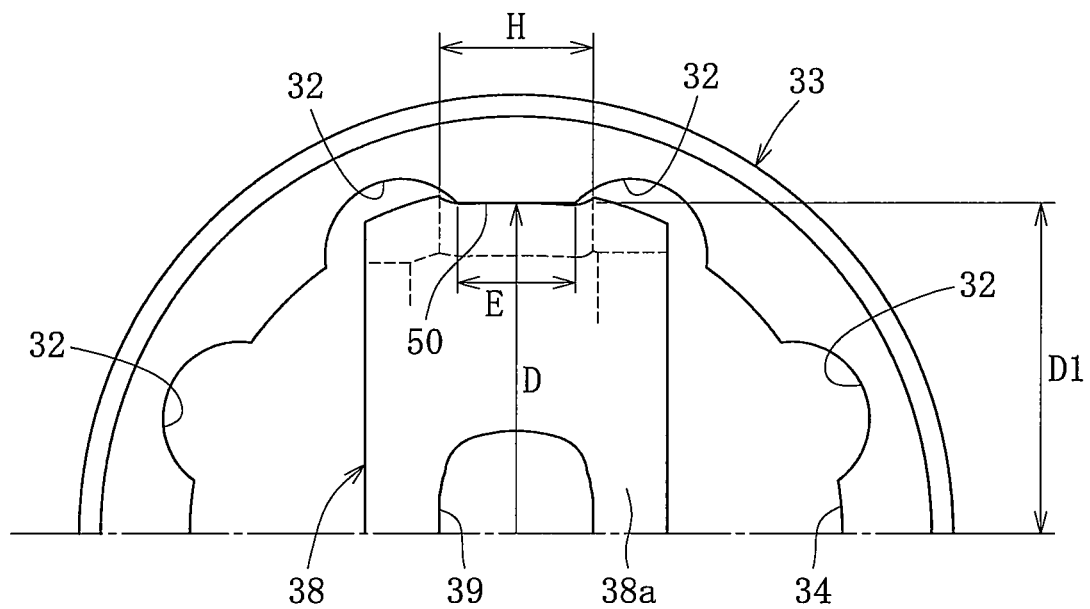
FIG. 5 An explanatory view illustrating a relationship between the outer joint member and a cage of the fixed type constant velocity universal joint.
Figure 6:
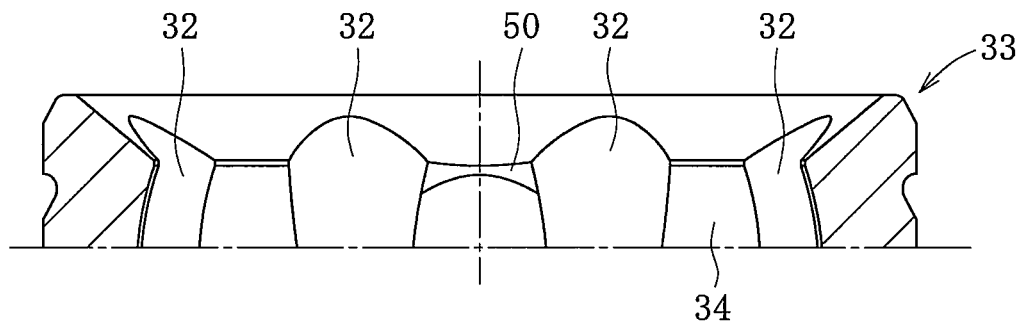
FIG. 6 A main-part sectional view of the outer joint member of the fixed type constant velocity universal joint.

By the way, as illustrated in FIGS. 5 and 6, along an opening end of the inner surface 31 of the outer joint member 33, cut portions 50 for inserting the cage are provided at at least two points symmetrical with each other with respect to an axial center. Each of the cut portions 50 is formed by cutting out the opening end into a flat shape. A dimension D between the cut portions 50 provided at the positions symmetrical with each other at 180° with respect to the axial center is set to be slightly smaller than a dimension D1 between pockets of the cage 38, which are provided at positions symmetrical with each other at 180° with respect to the axial center. Further, a dimension E between the track grooves adjacent to each other along a circumferential direction of the outer joint member 33 is set to be smaller than a pocket axial dimension H of the pocket of the cage 38.

Specifically, as illustrated in FIG. 5, under a state in which the pockets of the cage 38, which are provided at the positions symmetrical with each other at 180° with respect to the axial center, correspond respectively to the cut portions 50, the cage 38 can be fitted into the outer joint member 33.

When an effective cured-layer depth with Hv 600 is denoted by Dc and the diameter of the ball is denoted by d, the cage 38 an effective cured-layer depth ratio Dc/d of at least 0.067 or more, and has an ungrinded surface free from a soft layer having hardness smaller than that of a surface of a grinded portion. Note that, the cage 38 is made of a raw material such as S48C, and undergoes thermosetting treatment with use of, for example, a quenching furnace.

Figure 7:
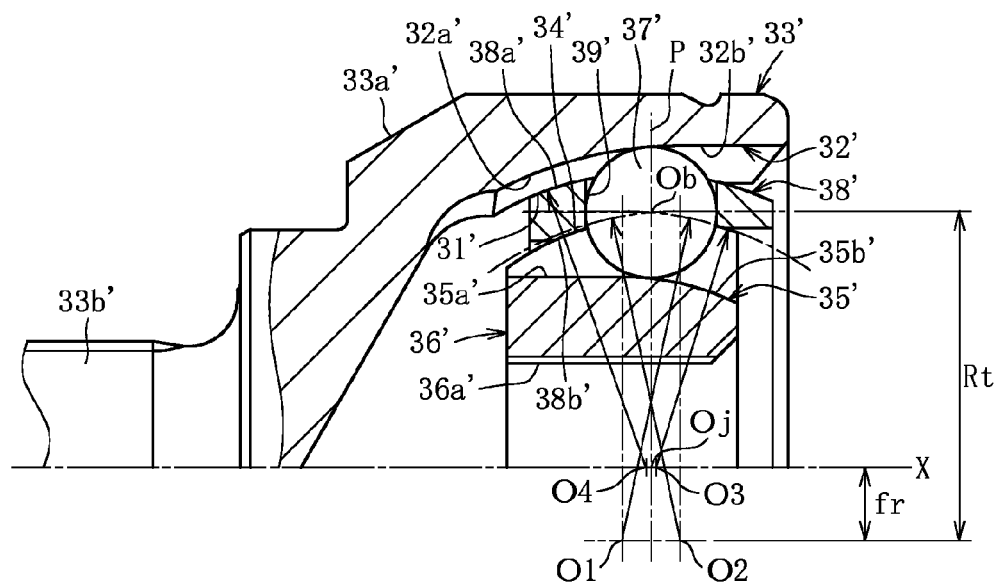
FIG. 7 A sectional view of the fixed type constant velocity universal joint according to a second embodiment of the present invention.
Figure 8:
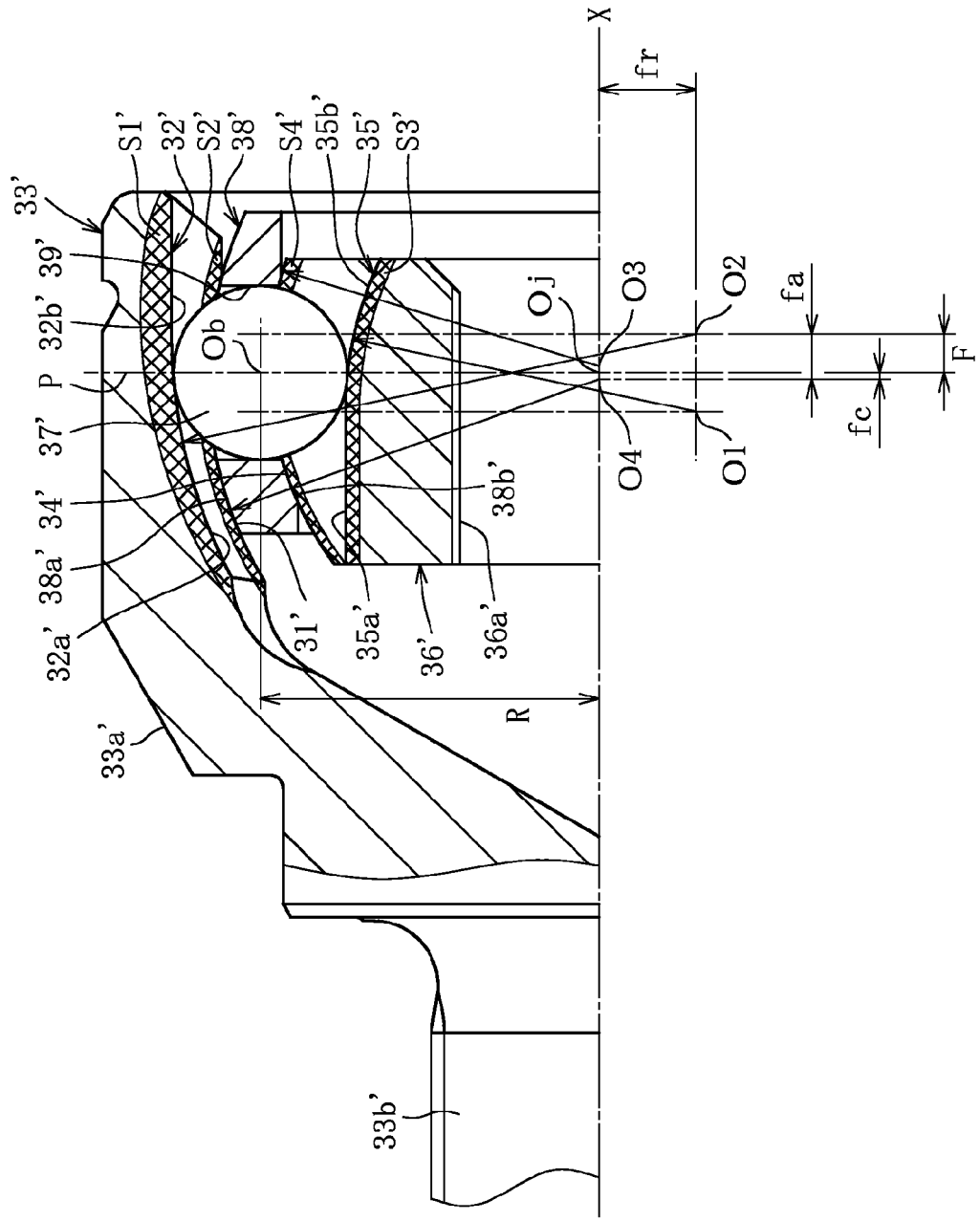
FIG. 8 Another sectional view of the fixed type constant velocity universal joint.

Next, FIGS. 7 and 8 illustrate a second embodiment of the present invention. In FIGS. 7 and 8, a member or portion which is common to a member or portion disclosed in FIGS. 1 and 2 is expressed with a compound mark configured by a combination of a mark used in FIGS. 1 and 2 and ('). As illustrated in FIG. 8, the center O4 of the spherical outer surface of the cage 38' is arranged on the center O1 side of the track groove of the inner joint member 36' with respect to the joint center Oj, and the center O3 of the spherical inner surface of the cage 38' is arranged on the center O2 side of the track groove of the outer joint member 33' with respect to the joint center Oj. In other words, the center O4 of the spherical outer surface of the cage 38' and the center O3 of the spherical inner surface of the cage 38' are each offset in the axial line direction by fc with respect to the joint center Oj. In contrast to track-direction cage offset illustrated in FIG. 18, the cage offset of such a type is referred to as counter-track-direction cage offset.

Also in this case, as illustrated in FIG. 8, the center (curvature center) O2 of the deep-side track groove 32a' of the track groove 32' of the outer joint member 33' is offset to the position spaced apart from the joint center plane P toward the joint opening side by the axial distance F and spaced apart from the joint center axial line X toward the radially opposite side with respect to the track groove 32' by the radial distance fr. Further, the center O1 of the opening-side track groove 35b' of the track groove 35' of the inner joint member 36' is offset to the position spaced apart from the joint center plane P toward the joint deep portion side by the axial distance F and spaced apart from the joint center axial line X toward the radially opposite side with respect to the track groove 35' by the radial distance fr.

The ratio R1 of F to Rt (=F/Rt) is set to fall within a range of 0.044≤R1≤0.087, and the ratio R3 of fr to Rt (=fr/Rt) is set to fall within the range of 0.07≤R3≤0.19. Further, when the axial distance between the center O4 of the spherical outer surface of the cage 38' (center of the inner surface of the outer joint member 33') or the center O3 of the spherical inner surface of the cage 38' (center of the outer surface of the inner joint member 36') and the joint center plane P is denoted by fc, and when a distance from the center Ob of the torque transmitting ball 37' to the joint center axial line X is denoted by R, a ratio R2 of fc to R (=fc/R) is set to 0.01 or less.

Also in the fixed type constant velocity universal joint illustrated in FIGS. 7 and 8, in the outer joint member 33', the cured layers S2' and S1' are provided respectively on the inner surface 31' of the mouth portion 33a' and the groove bottom of the track groove 32'. The cured layers S4' and S3' are provided respectively on the outer surface 34' and the track groove 35' of the inner joint member 36'. The inner joint member 36' can be made of a raw material such as SCr420. When the effective cured-layer depth with Hv 513 is denoted by Di and the diameter of the ball is denoted by d, the effective cured-layer depth ratio Di/d of each of the cured layers S3' and S4' in this case is at least 0.111 or more. Note that, other structural details of the fixed type constant velocity universal joint illustrated in FIGS. 7 and 8 are similar to structural details of the fixed type constant velocity universal joint illustrated in FIGS. 1 and 2, and hence description thereof is omitted.

In the structure as those in the first embodiment and the second embodiment, in which the curvature centers are radially offset, satisfactory operability is maintained even when the offset amount is much smaller than that in the conventional product. This is because an amount of a shift of the inner joint member 36, 36' from the joint center Oj, which is caused mainly by gaps, is smaller than those in conventional products. Specifically, the track grooves of present invention products are positioned on a radially outer side with respect to the joint center axial line X than those of the conventional products. Thus, eight track points, at which track load is generated at an operating angle, of the conventional products are different from those of the development products, which leads to a difference in positional relationship of the balls supporting the inner joint member 36, 36'. As a result, a shift direction and a shift amount of the inner joint member 36, 36' are different.

Figure 9:
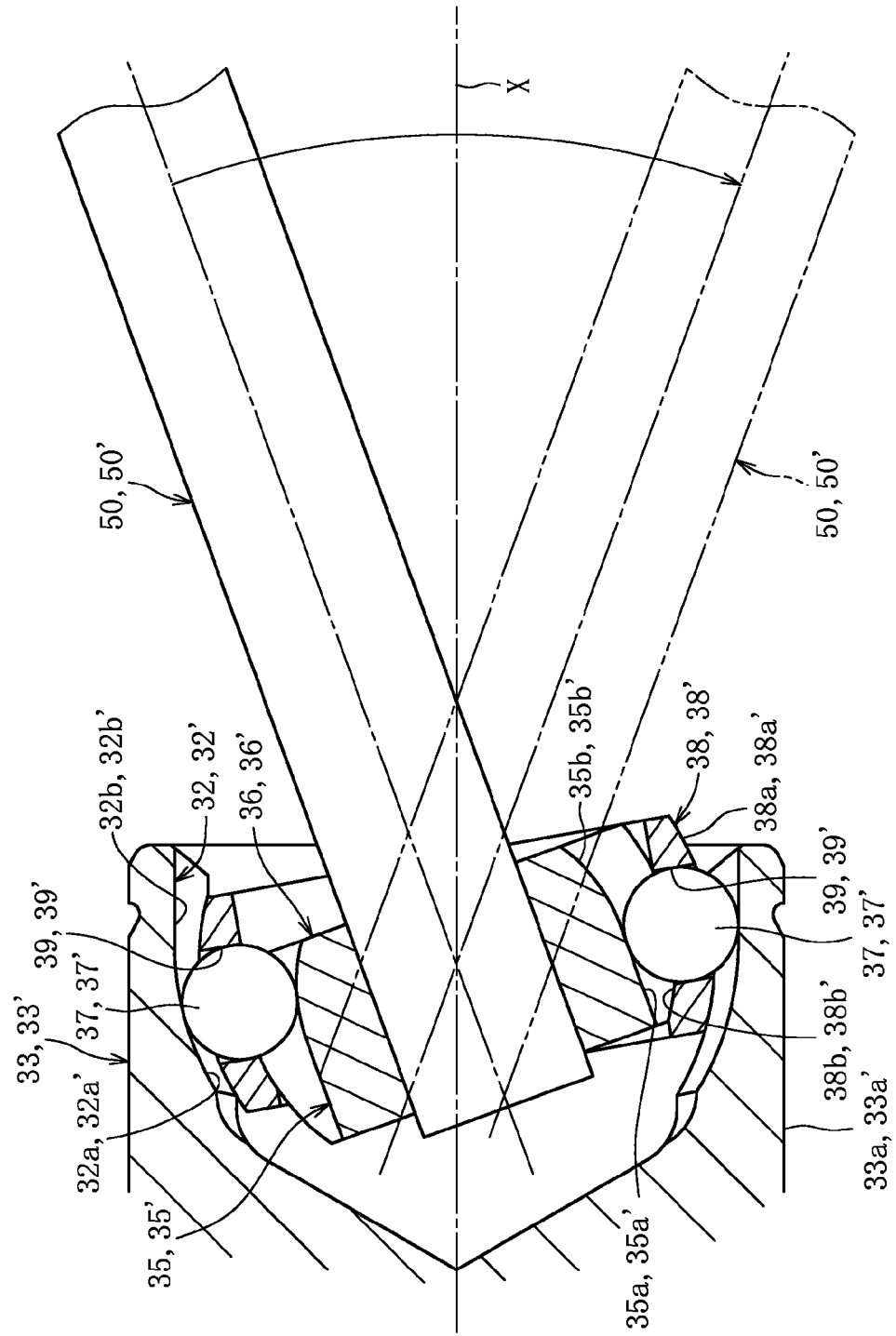
FIG. 9 A sectional view illustrating a bent state.

Next, description is made of an optimum range of the above-mentioned ratio R1 (=F/Rt). As illustrated in FIG. 9, the shaft is bent without torsional torque in an operating angle direction within a range of an operating angle of from −20° to +20°. That is, a value of bending resistance torque at the time of bending in the operating angle direction was calculated through mechanism analysis.

In this case, with regard to gaps in the joint, amounts of gaps between the balls 37, 37' and the track grooves 35, 35' of the inner joint member 36, 36' and between the balls 37, 37' and the track grooves 32, 32' of the outer joint member 33, 33' were set to be equal to those in mass-produced normal fixed type constant velocity universal joints of this type. Note that, a gap between the spherical inner surface (inner surface) 31, 31' of the outer joint member 33, 33' and the spherical outer surface of the cage was set to be a gap relatively small in the setting range, and a gap between the spherical outer surface (outer surface) 34, 34' of the inner joint member 36, 36' and the spherical inner surface 38b, 38b' of the cage was set to be a gap relatively large in the setting range. Further, gaps between the window portions 39, 39' of the cage 38, 38' and the balls 37, 37' are also set to be relatively small negative gaps in the gap setting range. In other words, a condition is set so that the bending resistance torque value in the operating angle direction is liable to be generated and operability is poor.

Figure 10:
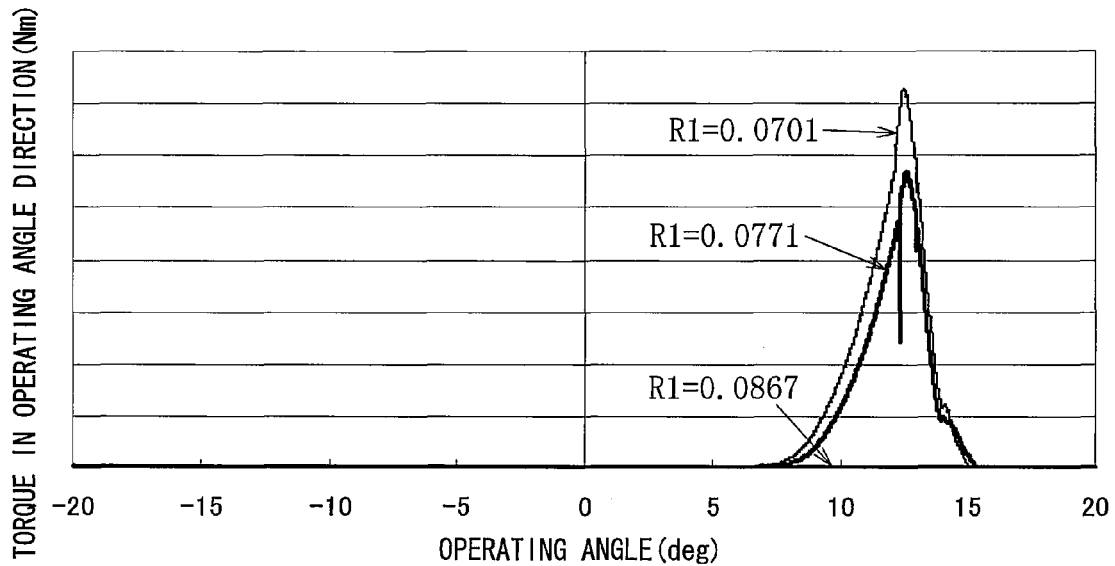
FIG. 10 A graph showing a relationship between an operating angle and torque in an operating angle direction.

FIG. 10 shows results of the above-mentioned analysis on eight balls in a conventional structure in which the curvature centers are not radially offset (cage is offset in a track center direction). In FIG. 10, a narrow line indicates a case where R1 is set to 0.0701, a bold line indicates a case where R1 is set to 0.0771, and a middle line indicates a case where R1 is set to 0.0867. As is understood from FIG. 10, in each of the cases where R1 is set to 0.0701 and R1 is set to 0.0771, the torque value starts to increase approximately at an operating angle of +7.5° and a peak value thereof is confirmed approximately at +13°. Further, the analysis results show the following: torque is not generated when the R1 value is 0.0867, and hence the conventional product is smoothly operated; and the bending resistance torque increases when the R1 value is small. In other words, operability of the conventional product in which the gaps as analysis conditions are formed is satisfactory as long as the R1 value is 0.0867 or more, and is deteriorated when the R1 value is smaller than 0.0867.

Figure 11:
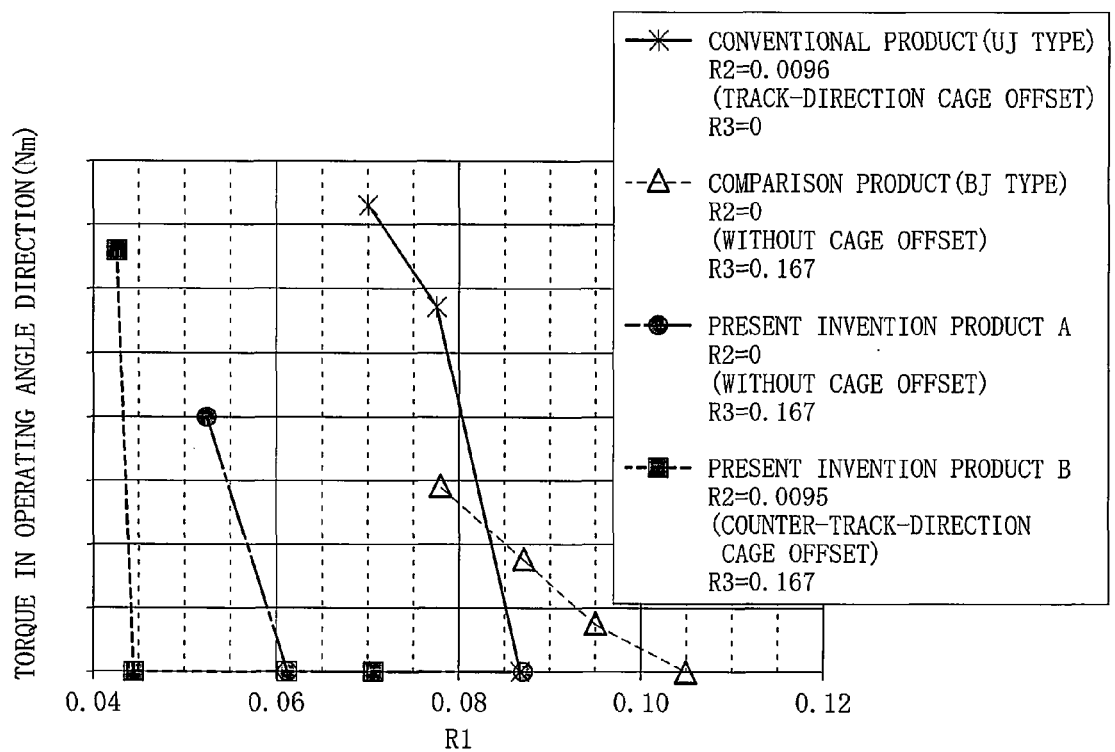
FIG. 11 A graph showing a relationship between R1 and the torque in the operating angle direction.
Figure 18:
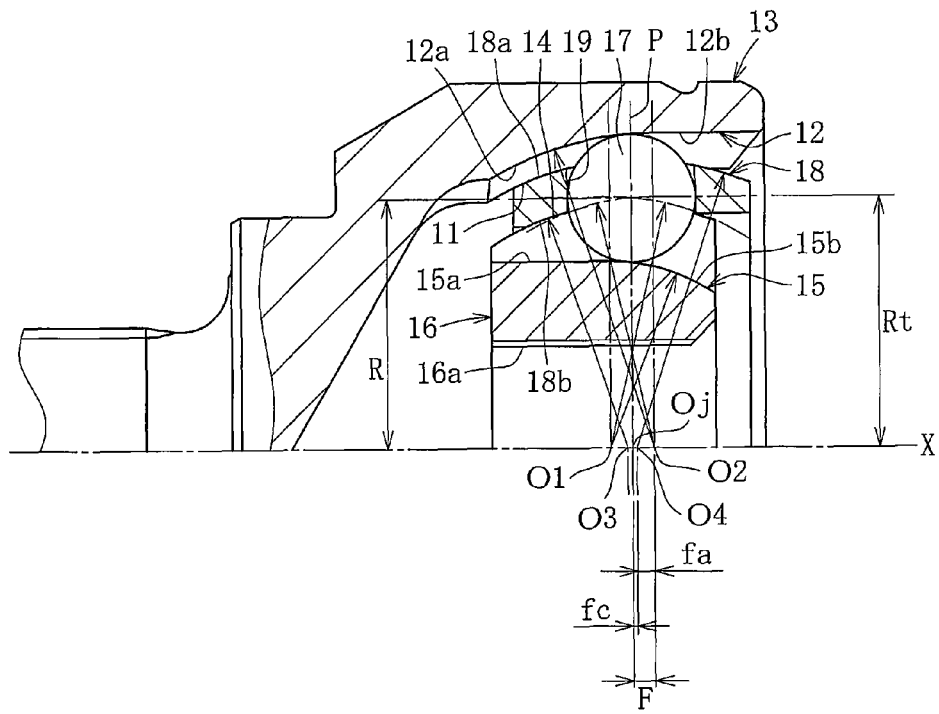
FIG. 18 A sectional view of a conventional fixed type constant velocity universal joint of an undercut free type.

Next, FIG. 11 shows results of comparison of maximum torque values between present invention products and conventional products, the maximum torque values of the present invention products being obtained by the above-mentioned analysis on R1 values, which are varied under the same gap conditions. In FIG. 11, a solid line indicates a conventional product (having track grooves not radially offset and a cage offset shape), a dashed line indicates the above-mentioned present invention product illustrated in FIG. 1 (referred to as present invention product A), and a broken line indicates the present invention product illustrated in FIG. 7 (referred to as present invention product B). As illustrated in FIG. 18, the conventional product is of the track-direction cage offset type, in which R2=0.0096 and R3=0 are established. Further, as illustrated in FIG. 1, the present invention product A is of a "without cage offset" type, in which R2=0 and R3=0.167 are established. As illustrated in FIG. 7, the present invention product B is of the counter-track-direction cage offset type, in which R2=0.0095 and R3=0.167 are established. In FIG. 11, Δ indicates a comparison product. The comparison product is a BJ type constant velocity universal joint of the without cage offset type, in which R2=0 and R3=0.167 are established.

As described above, in the structure of the present invention products, in which the curvature centers are radially offset, satisfactory operability is maintained even when the offset amount is much smaller than that in the conventional product. This is because, in the development products, the amount of the shift of the inner joint member from the joint center, which is caused mainly by the gaps, is smaller than those in conventional products. Specifically, the tracks of the present invention products are positioned on the radially outer side with respect to the center line than those of the conventional products. Thus, the eight track points, at which track load is generated at an operating angle, of the conventional products are different from those of the development products. In other words, the difference in positional relationship of the balls supporting the inner joint member leads to differences in shift direction and shift amount of the inner joint member.

As is understood from those analysis results, the B type (present invention product B) maintains satisfactory operability down to an R1 value, which is smaller than the case of the A type (present invention product A). Thus, it can be said that operability of the present invention product A is satisfactory when R1 is 0.061 or more and operability of the present invention product B is satisfactory when R1 is 0.045 or more.

By the way, the comparison product indicated by Δ in FIG. 11 has the BJ structure in which the groove bottom of the track groove is formed into a single circular arc shape and the curvature center of the track groove of the inner joint member and the curvature center of the track groove of the outer joint member are radially offset to each other (R3=0.167). As is understood from the comparison product, operability is deteriorated when the R1 value is 0.095 or less.

As described above, a phenomenon that operability can be secured within the small offset amount range is peculiar to an undercut free type structure. With use of the peculiar phenomenon, durability at normal angles is enhanced.

Figure 12:
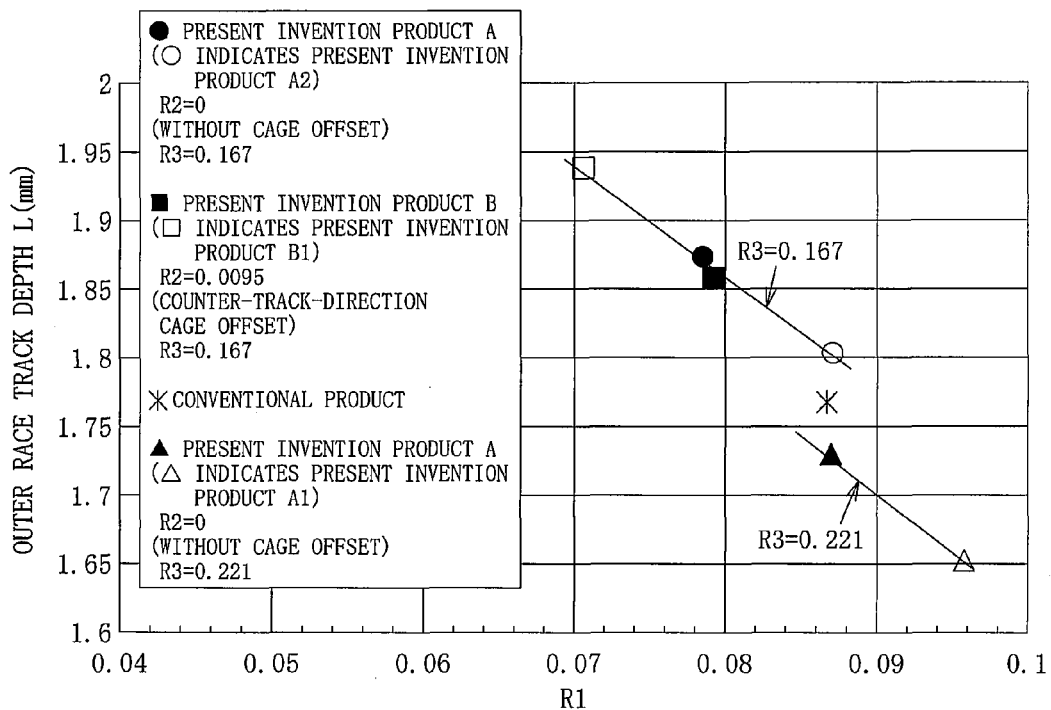
FIG. 12 A graph showing a relationship between R1 and an outer race track depth.
Figure 13:
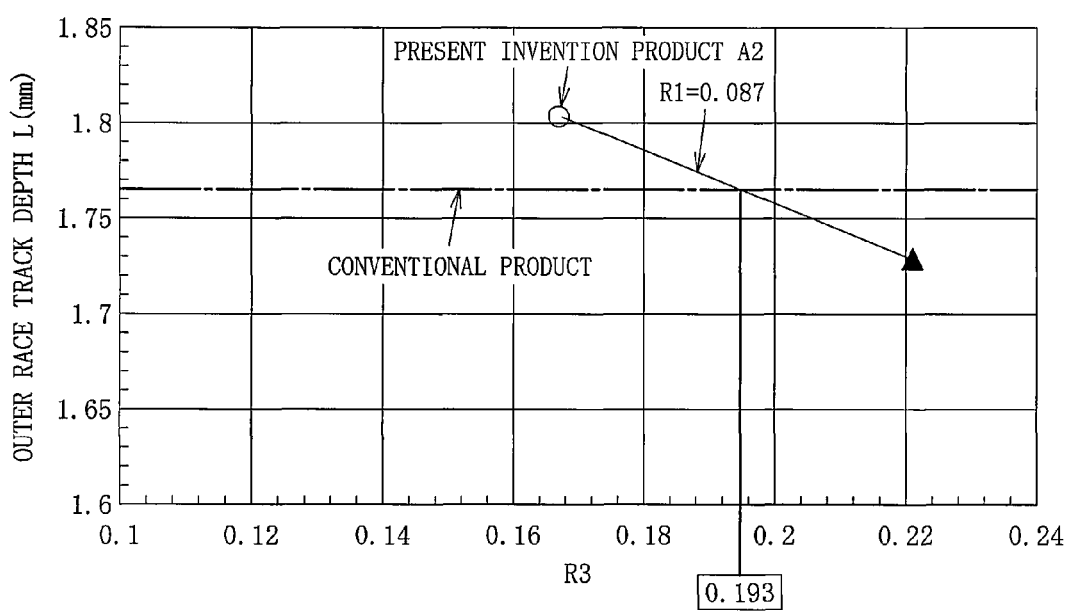
FIG. 13 A graph showing a relationship between R3 and the outer race track depth.

Next, FIGS. 12 and 13 show values of a track depth of the outer joint member 33, 33' under a normal-angle durability test condition (6°). FIG. 12 shows a relationship between R1 and the track depth of the outer joint member 33, 33'. In FIG. 12, ■ indicates the A type of the without cage offset type, in which R2=0 and R3=0.167 are established. In particular, ○ indicates the track depth when R1=0.087 is established (in other words, A2 type). ■ indicates the B type of the counter-track-direction cage offset type, in which R2=0.0095 and R3=0.167 are established. In particular, □ indicates the track depth when R1=0.071 is established. ▲ indicates the A type of the without cage offset type, in which R2=0 and R3=0.221 are established. In particular, Δ indicates the track depth when R1=0.096 is established (in other words, A1 type). * indicates a conventional product, in which R1=0.087, R2=0.0096, and R3=0 are established.

FIG. 13 shows a relationship between R3 and the track depth of the outer joint member 33. In FIG. 13, ○ indicates the A2 type, in which R3=0.167, R1=0.087, and R2=0 are established. ▲ indicates the A type, in which R3=0.221, R1=0.087, and R2=0 are established.

At the normal angle (6°), the track depth increases as the R1 value becomes smaller, and the track depth increases as the R3 value becomes smaller. Note that, the B type (cage offset product) is advantageous because the R1 values are small. Here, the track depth refers to a distance L from a ball contact point to a spherical surface (refer to FIG. 3), the distance L being measured at a position at which a contact ellipse 51 of the ball, which moves in the track in the axial direction and directions of the contact angles α, comes closest to the spherical surface during one rotation based on results of analysis on a joint internal force in a rotational state under a durability condition at a normal angle (operating angle of 6°) at which high torque is applied.

Among normal-angle durability tests, in a test in which especially high torque is applied, the ball contact ellipse 51 becomes larger owing to high load on the track. Therefore, the ball contact ellipse 51 protrudes onto the inner surface of the outer joint member 33, and edge load causes peeling. In terms of this, in order to enhance durability, the distance L from the ball contact point to the spherical surface portion is preferred to be longer.

Figure 14:
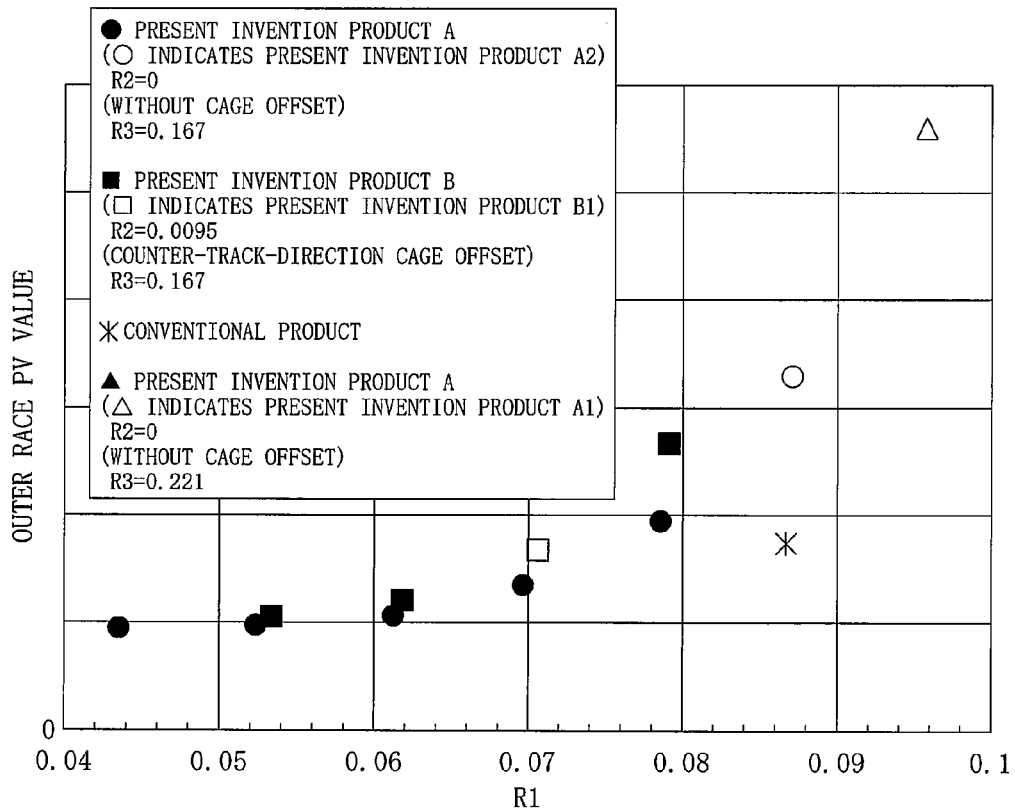
FIG. 14 A graph showing a relationship between R1 and an outer race PV value.

Next, FIG. 14 shows a PV value of the outer joint member, which is obtained as a result of analysis under the normal-angle durability test condition (6°). The PV value is obtained by multiplying a skidding speed between the ball and the track by the track load. Durability is enhanced as the PV value becomes smaller. As is understood from analysis results, the PV value becomes smaller as the R1 value becomes smaller. However, the PV value does not sharply decrease when the R1 value is 0.071 or less. Note that, the B type (cage offset product) is advantageous because the R1 values are small. Further, there is a relationship that, in contrast to the PV value of the outer joint member, a PV value of the inner joint member becomes larger as the R1 value becomes smaller. Thus, there is a risk that durability of the inner joint member is deteriorated owing to the increase in PV value of the inner joint member. When the R1 value is 0.071, failures of the inner joint member have not been found. Note that, types of present invention products indicated by ■, □, ▲, Δ, •, and ○ in FIG. 14 represent the same types of the fixed type constant velocity universal joints indicated by ■, □, ▲, Δ, •, and ○ shown in FIG. 12.

Figure 15:
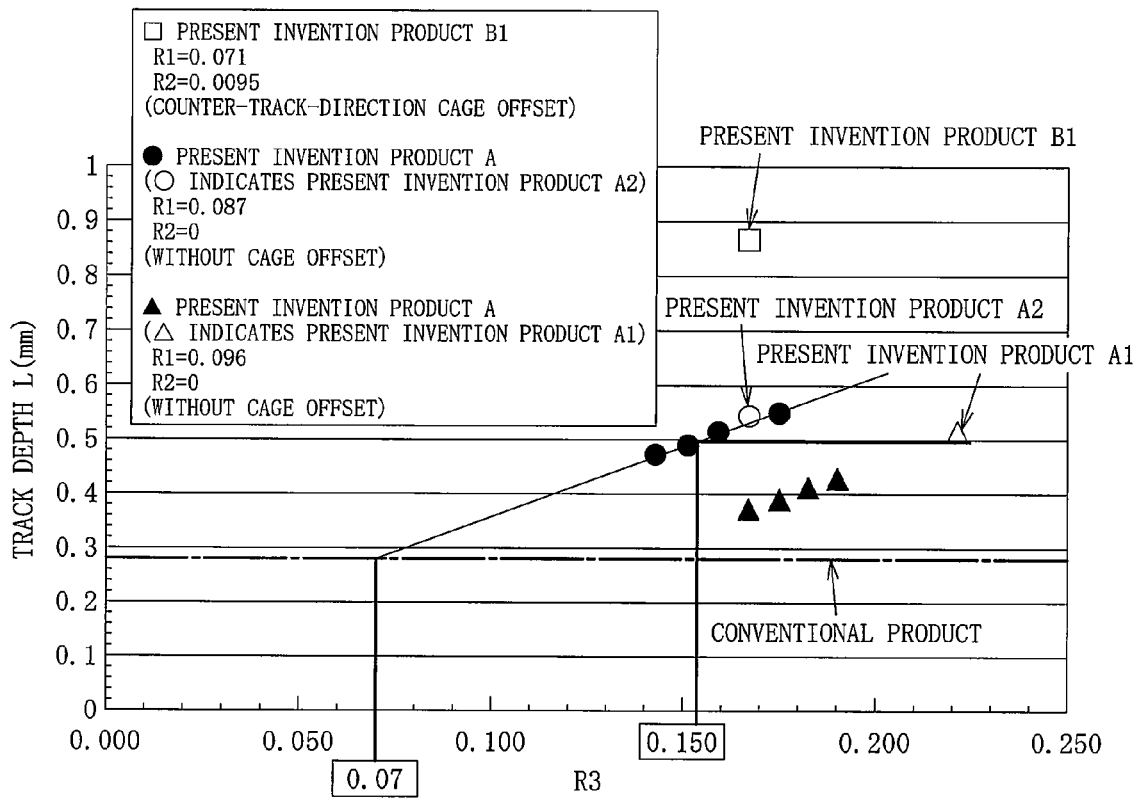
FIG. 15 A graph showing a relationship between R3 and a track depth.

Next, FIG. 15 shows track depths obtained as a result of analysis on a case where torque of 250 Nm is applied at an operating angle of 46°. In FIG. 15, □ indicates the B type of the counter-track-direction cage offset type, in which R1=0.071, R2=0.0095, and R3=0.167 are established (in other words, B1 type). • indicates the A type of the without cage offset type, in which R1=0.087 and R2=0 are established. In particular, ○ indicates the track depth when R3=0.167 is established (in other words, A2 type). ▲ indicates the A type of the without cage offset type, in which R1=0.096 and R2=0 are established. In particular, Δ indicates the track depth when R3=0.221 is established (in other words, A1 type).

As described above, at the operating angle of 46°, the track depth increases as the R3 value becomes larger, and the track depth increases as the R1 value becomes smaller. When the R1 value is 0.087 and the R3 value is 0.07, the depth is equivalent to that of the conventional product.

Here, Table 1 shows values of R1, R2, and R3 of the conventional product and each of the types of the present invention products, and the cage offset types. Note that, R1, R2, and R3 of the conventional product also respectively represent the ratio R1 (=F/Rt), the ratio R2 (=fc/R), and the ratio R3 (=fr/Rt).

TABLE 1

|  |  | Conventional product | Type of the present invention product A | | Type of the present invention product B |
|---|---|---|---|---|---|
|  |  |  | A1 | A2 | B1 |
| Offset | R1 | 0.087 | 0.096 | 0.087 | 0.071 |
| Cage offset | R2 | 0.0096 | 0 | 0 | 0.0095 |
| Directions Positions of the track center and the spherical center with respect to the joint center |  | Same direction |  |  | Opposite direction |
| Radial offset | R3 | 0 | 0.221 | 0.167 | 0.167 |

As is understood from FIGS. 10 to 15 above, with regard to R1, a preferred range of the A type is from 0.061 to 0.087 and a preferred range of the B type is from 0.044 to 0.087. As is understood from FIG. 11, lower limit values in this case each correspond to a limit value of the operability, and an upper limit value in this case corresponds to a limit value of a range in which results of normal-angle durability tests (described below) and track depths greater than those of the conventional product can be secured. In particular, a more preferred range of the A type is from 0.061 to 0.071, and a more preferred range of the B type is from 0.044 to 0.071. Those ranges correspond to ranges in which PV values are equal to or smaller than those of the conventional product in FIG. 14. With the setting of those upper limit ranges, the track depths are further increased, with the result that durability is further enhanced.

R2 is preferred to be 0.01 or less. This is because, when R2 exceeds 0.01, a thickness of the cage 38' on the opening side (joint opening side) is reduced, which leads to a risk that strength is deteriorated.

R3 is preferred to range from 0.07 to 0.19. Specifically, as is understood from FIG. 15, when R1 is set to the preferred value of 0.087, R3 is set to 0.07 or more, which is a lower limit value of a range in which the track depth equivalent to that of the conventional product can be secured. Simultaneously, in consideration of a track depth obtained as a result of the normal-angle durability tests described below, R3 is set to be 0.19 or less (refer to FIG. 13), which is an upper limit value of a range in which the track depth equivalent to that of the conventional product can be secured. In particular, R3 is more preferred to be set to range from 0.15 to 0.19. The R3 value of 0.15 is a lower limit value of a range in which a track depth level of the present invention product A1, which is shown in FIG. 15 and corresponds to the R1 value of 0.087, is secured.

In the present invention, the radial offset is provided at the center of the track groove 32, 32' of the outer joint member 33, 33' (curvature center of the curved portion). With this, in comparison with a case where the radial offset is not provided, a groove depth of a part of the track groove 32, 32' on the joint deep portion side is relatively large, and hence rigidity of a wall portion of the track groove 32, 32' on the joint deep portion side increases. Therefore, when the joint forms a high operating angle and the torque transmitting ball 37, 37' transmits torque at a position of the track groove 32, 32' on the joint deep portion side, an edge part of the wall portion of the track groove 32, 32' on the joint deep portion side is suppressed from being deformed. As a result, a torsional strength of the joint in a high operating angle range is enhanced. Further, a torque capacity in the high operating angle range increases. Here, the torque capacity refers to torque which causes an end portion of the contact ellipse formed of a contact portion between the torque transmitting ball 37, 37' and the track groove 32, 32' to overlap an edge line of the track groove 32, 32' when the joint transmits torque at a certain operating angle.

As described above, in the present invention, the torque capacity increases on the deep side of the outer joint member at high operating angles. Thus, rigidity of a wall surface of the track groove is enhanced. As a result, the track edge portions are suppressed from being deformed, and hence torsional strength is enhanced. In addition, the track depth increases on the deep side of the outer joint member at high operating angles. Thus, a climb-up torque increases and the edge load decreases, with the result that durability at high operating angles is enhanced. At normal angles, the track depth equivalent to that of the conventional product can be secured, and durability is equivalent to or higher than that of the conventional product. In particular, when R1=0.071 or less is established, the track depth increases further and the PV value decreases, and hence durability is enhanced. As described above, the fixed type constant velocity universal joint is capable of satisfying demand for high durability, and hence downsizing, weight reduction, and cost reduction can be achieved. Further, when the PV value is set to be smaller than that of the conventional product by establishing R1=0.087 or less, axial load from the balls 37, 37' to the cage 38, 38' and radial moving amounts of the balls 37, 37' decrease. As a result, efficiency is enhanced. Thus, the fixed type constant velocity universal joint according to the present invention is best suited for a drive shaft for automobiles.

In order to enhance durability and strength at high operating angles, the track depth on the deep side of the outer joint member 33, 33' was increased by setting R1, R2, and R3 described above within the above-mentioned ranges. Next, the inner joint member 36, 36' has a UJ track shape, and hence is straight on a side on which the track depth is smaller when high angles are formed. Thus, even in the shape formed according to the above-mentioned ranges of R1, R2, and R3, the depth of the inner race track 35, 35' (track 35, 35' of the inner joint member 36, 36') at high angles is not large. Under the circumstance, in order to enhance durability and strength of the inner joint member 36 at high angles, the inventors focused on the effective cured-layer depth, and ranges of the effective cured-layer depth, in which durability and strength are effectively enhanced, were confirmed through tests. Here, the effective cured-layer depth was represented by the effective cured-layer depth ratio Di/d, where Di denotes the effective cured-layer depth with Hv 513 and d denotes the diameter of the ball 37, 37'. Note that, the reason for using Di/d as an index for the effective cured-layer depth is as follows. When a joint size increases, in accordance therewith, permissible torque and a ball diameter increase. When the permissible torque is applied, maximum stress is generated from the ball by a force generated by contact between the ball and the track at a certain depth position from the contact surface. In any joint size, the depth position at which the maximum stress is generated at the time of bearing the permissible torque becomes deeper in proportion to the joint size and also in proportion to a diameter of the balls used in accordance with the joint size. The effective cured-layer depth is determined in proportion to the depth from the contact surface, at which the maximum stress is generated. Thus, the ratio obtained by dividing the effective cured-layer depth by the ball diameter was used as the index for the effective cured-layer depth irrespective of the joint size. For the same reason, the ratio obtained by dividing the effective cured-layer depth by the ball diameter proportional to the joint size and the permissible torque was used as an index for the effective cured-layer depth of the cage irrespective of the joint size.

Further, when the effective cured-layer depth with Hv 513 is denoted by Di and the diameter of the ball is denoted by d, the effective cured-layer depth ratio Di/d of the inner joint member 36, 36' is at least 0.111 or more. Thus, rigidity of the edge portions of shoulder portions of the track groove is enhanced, and hence local deformation is suppressed. As a result, strength and durability are enhanced. Note that, as described above, by forming the inner joint member 36, 36' with SCr420, forgeability is more satisfactory than that of SCr435, and cost reduction can be achieved. Further, hardness of a core portion can be set to from Hv 300 to Hv 400. This is because necessary strength cannot be obtained when the hardness is less than Hv 300, and cracks are more liable to be formed and hence enhancement of strength is suppressed when the hardness is Hv 400 or more.

When the effective cured-layer depth with Hv 600 is denoted by Dc and the diameter of the ball is denoted by d, the cage 38, 38' has the effective cured-layer depth ratio Dc/d of at least 0.067 or more, and has an ungrinded surface provided with a soft layer having hardness smaller than that of a surface of a grinded portion. Thus, a cage with high strength can be formed. Further, a quenching furnace is used, and hence cost can be reduced in comparison with the case of induction hardening.

When the cut portions (relief portions) 50 for inserting the cage are provided at the two points symmetrical with each other with respect to the axial center along the opening end of the inner surface 31, 31' of the outer joint member 33, 33', spherical surface areas of other parts on the opening side are larger. With this, strength and durability are enhanced. Each of the relief portions 50 at the two points has a flat surface-like shape, which is formed along a window frame shape of the cage 38, 38'. With this, a spherical surface area of a circumferential central portion of the spherical inner surface is larger than that in a conventional circular arc shape formed by grinding, and hence is more desirable. Further, the relief portions at the two points can be formed at low cost by employing cold forging.

Through axial projection of the opening end surface 42 of the outer joint member 33, 33' by the projecting amount t, a volume of the cup portion (mouth portion) 33a, 33a' of the outer joint member 33, 33' can be increased without involving an increase in radial dimension under a state in which a maximum operating angle is maintained. Further, the uncured layer 44 is formed from the opening end surface 42 of the projecting portion 43 to the outer peripheral surface of the cup portion (mouth portion) 33a, 33a', which is continuous with the opening end surface 42. Thus, an area of the uncured layer 44 increases on the opening end side. As a result, the opening end side is suppressed from being deformed by induction hardening, which leads to a higher yield and can achieve cost reduction.

Hereinabove, description is made of the embodiments of the present invention. However, the present invention is not limited to the above-mentioned embodiments, and various modifications can be made thereto. For example, the axial offset amount, the radial offset amount, the cage offset amount, and the like can be arbitrarily set as long as R1, R2, and R3 fall within the above-mentioned optimum ranges. Further, operability is enhanced by the radial offset, and hence the R1 value can be set small. Thus, the center O4 of the spherical outer surface of the cage 38, 38' may be arranged on the center O2 side of the track groove 32, 32' of the outer joint member 33, 33' with respect to the joint center Oj, and the center O3 of the spherical inner surface of the cage 38, 38' may be arranged on the center O1 side of the track groove 35, 35' of the inner joint member 36, 36' with respect to the joint center Oj. The fixed type constant velocity universal joint according to the present invention is not limited to use for a drive shaft, and can be used for a propeller shaft, and further in a transmission system for various other industrial machines. Note that, although the curved portion of each of the track grooves 32, 32' and 35, 35' is formed of a single circular arc in the fixed type constant velocity universal joint illustrated in FIG. 1 and also in the fixed type constant velocity universal joint illustrated in FIG. 7, the curved portion may be formed of a plurality of circular arcs. When the curved portions are each formed of a single circular arc, there are advantages of ease in processing and reduction of a manufacturing cost.

EXAMPLES

Example 1

(In Example 1 and Example 2 described below, the outer joint member is referred to as an outer race, and the inner joint member is referred to as an inner race.)

The normal-angle durability tests (operating angle of 6°) were carried out under a high torque condition, and Table 2 below shows the test results. In this case, the following samples were prepared: two samples of a conventional product (conventional product No. 1 and conventional product No. 2); two samples of the above-mentioned present invention product A1 (present invention product A1 No. 1 and present invention product A1 No. 2); and four samples of each of the above-mentioned present invention product A2 and the above-mentioned present invention product B (present invention product A2 No. 1, present invention product A2 No. 2, present invention product A2 No. 3, present invention product A2 No. 4, present invention product B1 No. 1, present invention product B1 No. 2, present invention product B1 No. 3, and present invention product B1 No. 4). The durability tests were carried out under a condition of torque of 834 Nm at a rotational speed of 230 r/min.

the operation was not able to be continued any longer. In addition, after the elapse of the evaluation time of two hundred and seventy six hours, a failure in which the outer race was damaged (failure in which the operation was able to be continued) occurred in each of the present invention product A2 No. 1, the present invention product A2 No. 3, and the present invention product A2 No. 4. Note that, the track depths obtained through the analysis on the present invention products support the above-mentioned graphs of FIGS. 12 and 13 and the PV value in FIG. 14.

As described above, although the failure of the inner race occurred in the conventional products, the failure of the inner race did not occur in the present invention products. This is because, by the radial offset, surface pressure is reduced owing to a large track main curvature derived from a large radius of the circular arc portion of the inner race. With regard to the present invention products, similarly to the track depth and the PV value obtained as the analysis results, it was confirmed that the failures having occurred in the outer race were suppressed as the track depth increased or the PV value became smaller, with the result that the durability was enhanced. It can be seen that the present invention products are more durable than the conventional products.

TABLE 2

| Specification of sample | Sample No. | Evaluation time | Damage Part |
|---|---|---|---|
| Conventional product | No. 1 | → △ | Inner race |
| | No. 2 | → △ | Inner race |
| Present invention product A1 | No. 1 | → ○ → x | Outer race and ball |
| | No. 2 | → ○ → x | Ball |
| Present invention product A2 | No. 1 | → ○ → △ | Outer race |
| | No. 2 | → ○ → ○ | |
| | No. 3 | → ○ → △ | Outer race |
| | No. 4 | → ○ → △ | Outer race |
| Present invention product B1 | No. 1 | → ○ → ○ | |
| | No. 2 | → ○ → ○ | |
| | No. 3 | → ○ → ○ | |
| | No. 4 | → ○ → ○ | |

In Table 2, △ indicates a state in which operation was able to be continued despite of a failure, and x indicates a state in which the operation was not able to be continued owing to a serious failure. After elapse of an evaluation time of one hundred and thirty eight hours, a failure in which the inner race was damaged occurred in each of the conventional product No. 1 and the conventional product No. 2. Meanwhile, such a failure did not occur in the present invention products. Further, after elapse of an evaluation time of two hundred and seventy six hours, significant failures occurred in the outer race and the balls of the present invention product A1 No. 1, with the result that the operation was not able to be continued any longer. Similarly, significant failures occurred in the balls of the present invention product A1 No. 2, with the result that

Example 2

Next, durability tests at high angles were carried out, and Table 3 below shows the test results. In this case, the following samples were prepared: two samples of a conventional product (conventional product No. 1 and conventional product No. 2); and two samples of each of the present invention product A1, the present invention product A2, and the present invention product B (present invention product A1 No. 1, present invention product A1 No. 2, present invention product A2 No. 1, present invention product A2 No. 2, present invention product B1 No. 1, and present invention product B1 No. 2). The durability tests were carried out under a condition of torque of 549 Nm at an angle of from 0° to 46° (rocking) and a rotational speed of 80 r/min.

TABLE 3

| Specification of the sample | Sample No. | Part | Evaluation Time | | | | | Damage condition |
|---|---|---|---|---|---|---|---|---|
| | | | 3.7 | 7.4 | 11.1 | 14.8 | 18.5 | |
| Conventional product | No. 1 | Outer race | △ | Replace with a new one (dummy) | | | | Track chipping on the deep side |
| | | Inner race | | △ | | | | Track chipping in the straight portion |
| | | Cage and ball | | ○ | | | | |
| | No. 2 | Outer race | △ | Replace with a new one (dummy) | | | | Track chipping on the deep side |
| | | Inner race | | ○ | | | | |
| | | Cage and ball | | ○ | | | | |
| Present invention product A1 | No. 1 | Outer race | | △ | | | | Track chipping on the deep side |
| | | Inner race | | ○ | | | | |
| | | Cage and ball | | ○ | | | | |
| | No. 2 | Outer race | | △ | | | | Track chipping on the deep side |
| | | Inner race | | ○ | | | | |
| | | Cage and ball | | ○ | | | | |
| Present invention product A2 | No. 1 | Outer race | | | | △ | | Track chipping on the deep side |
| | | Inner race | | | | ○ | | |
| | | Cage and ball | | | | ○ | | |
| | No. 2 | Outer race | | | | △ | | Track chipping on the deep side |
| | | Inner race | | | | ○ | | |
| | | Cage and ball | | | | ○ | | |
| Present invention product B1 | No. 1 | Outer race | | | | | ○ | |
| | | Inner race | | | | | ○ | |
| | | Cage and ball | | | | | ○ | |
| | No. 2 | Outer race | | | | | ○ | |
| | | Inner race | | | | | ○ | |
| | | Cage and ball | | | | | ○ | |

After evaluation for three point seven hours, a failure of track chipping of the deep-side track groove of the outer race occurred in each of the conventional product No. 1 and the conventional product No. 2. Then, only the outer race of each of the two conventional products was replaced with a new one and evaluation was continued. As a result, after evaluation for seven point four hours, a failure of track chipping of the deep-side track groove of the inner race occurred in the conventional product No. 1. Similarly, after the evaluation for seven point four hours, the failure of track chipping of the deep-side track groove of the outer race occurred in each of the present invention product A1 No. 1 and the present invention product A1 No. 2. After operation for fourteen point eight hours, the failure of track chipping of the deep-side track groove of the outer race occurred in each of the present invention product A2 No. 1 and the present invention product A2 No. 2. Meanwhile, even after evaluation for eighteen point five hours, such failures did not occur in the outer race, the inner race, the cage, or the balls of each of the present invention product B1 No. 1 and the present invention product B1 No. 2.

By the way, the conventional products used in the durability tests at high angles, which are shown in Table 3, had conventional specifications shown in Table 4. Further, with regard to each of the present invention products A1, A2, and B1 shown in Table 3, a specification (a) shown in Table 4 below was used for the inner race, a specification (c) shown in Table 4 was used for the outer race, and a specification (b) shown in Table 4 was used for the cage.

TABLE 4

| Part | Specification symbol | Invention specification | Conventional specification |
|---|---|---|---|
| Inner race | (a) | Effective cured-layer depth ratio (up to Hv 513) Di/d: 0.108~0.109 | Effective cured-layer depth ratio (up to Hv 513) Di/d: 0.075 |
| Cage | (b) | Effective cured-layer depth ratio (up to Hv 600) Dc/d: 0.067 | Effective cured-layer depth ratio (up to Hv 600) Dc/d: 0.037 |
| Outer race | (c) | Two opposite points on the inlet portion of the spherical inner surface are each cut to have a flat surface | All the points on the inlet portion of the spherical inner surface are cut in a cylindrical manner |
| Outer race | (d) | Large end surface position t = 0.13d | Large end surface position t = 0.02d |

As described above, when the inner joint member 36, 36' according to the specification (a) was used, rigidity of the edge portions of the shoulder portions of the straight 35*a* of the track grooves 35, 35' of the inner joint member 36, 36' was enhanced. As a result, local deformation was suppressed and durability was enhanced. Further, when the outer joint member 33, 33' according to the specification (c) was used, the spherical surface area of a part of the spherical inner surface of the outer race on the opening side, other than the relief portions 50, is increased. As a result, strength and durability were enhanced. As can be seen from the above, the present invention products are more durable than the conventional products, and the present invention product B1 is especially durable.

Example 3

Next, rotation torsional strength tests were carried out. In the tests, under a state in which rotation was performed at a fixed low speed and at an operating angle of 46°, torque was gradually increased until fracture occurred, and strength was evaluated based on values of torque generated at the time of the fracture. The graph of FIG. 16 and Table 5 below showed the test results. The tests were carried out on conventional products wherein a specification of the inner race was changed to the invention specification (a) shown in Table 4, in which a specification of the cage was changed to the invention specification (b) shown in Table 4, in which a specification of the outer race was changed to the invention specification (c) shown in Table 4, in which a specification of the outer race was changed to the invention specification (d) shown in Table 4, and in which specifications of the inner race, the cage, and the outer race were changed respectively to the invention specifications (a), (b), and (c). The tests were carried out also on present invention products B1 in which specifications were changed to the invention specifications (a), (b), (c), and (d).

TABLE 5

| Joint type | Specification | Average fracture torque (ratio represented by % with respect to that of conventional product) | n number |
|---|---|---|---|
| Conventional product | Conventional specification | 100 | 4 |
| | (a) | 104 | 4 |
| | (b) | 108 | 2 |
| | (c) | 108 | 2 |

TABLE 5-continued

| Joint type | Specification | Average fracture torque (ratio represented by % with respect to that of conventional product) | n number |
|---|---|---|---|
| | (d) | 106 | 2 |
| | (a + b + c) | 125 | 2 |
| Present invention product B1 | (a + b + c + d) | 139 | 2 |

Figure 16:
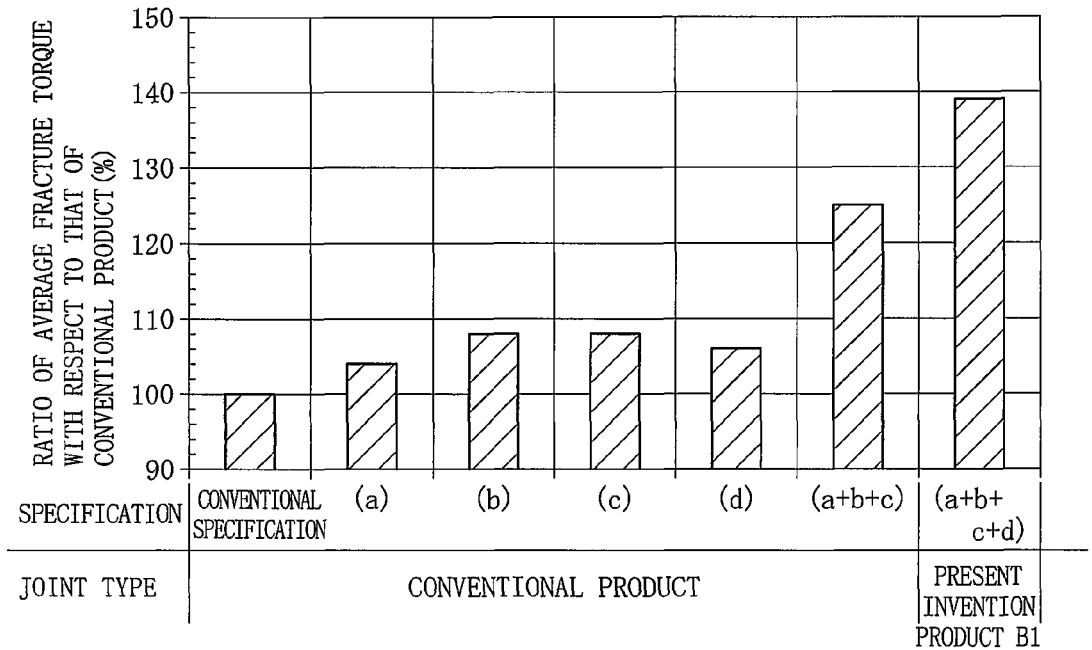
FIG. 16 A graph showing results of rotational torsional strength tests.
Figure 17:
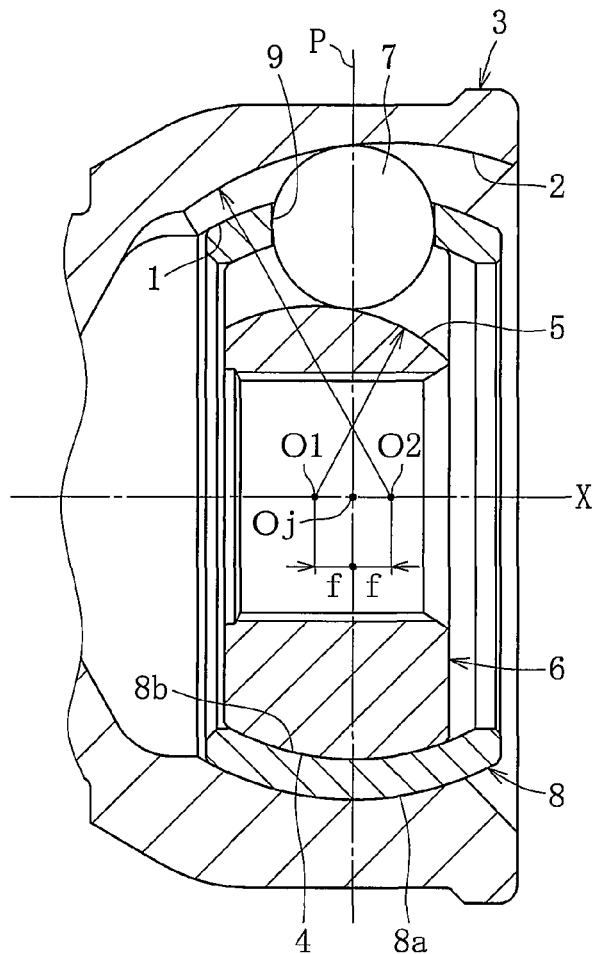
FIG. 17 A sectional view of a fixed type constant velocity universal joint of a Rzeppa type.

As is understood from FIG. 16 and Table 5, when the specification was changed to the specification (a), the fracture torque was 4% higher than that of the conventional specification. When the specifications were changed to the specifications (b) and (c), the fracture torque was 8% higher than that of the conventional specification. Further, when the specification was changed to the specification (d), the fracture torque was 6% higher than that of the conventional specification. Still further, when the specifications were changed to the specifications (a), (b), and (c), the fracture torque was 24% higher than that of the conventional specification. When the specifications of the present invention products B1 were changed to the invention specifications (a), (b), (c), and (d), the fracture torque was 39% higher than that of the conventional specification of the conventional product.

Further, as shown in the results of the rotation torsional strength tests, when t=0.13 d is established, strength is 6% higher than that of the conventional specification. Thus, in the present invention, from the above-mentioned facts, a range in which strength is sufficiently enhanced is defined by setting t to be equal to 0.13 d or more. Further, the reason for setting the upper limit of t to 0.185 d is that, when t exceeds 0.185 d, a radial length a of the opening end surface 42 (refer to FIG. 4) decreases, with the result that processing failures may be caused by dents formed in another outer joint member 33 during conveyance for the purpose of processing.

According to stress analysis (operating angle of 46°), in comparison with the shape of the inlet portion of the spherical inner surface of the outer race, which is formed by cutting all the points in a cylindrical manner according to the conventional specification, in the shape of the inlet portion of the spherical inner surface of the outer race, which is formed according to the specification (c) of the present invention, a maximum value of stress generated on the track groove bottom at the opening end portion decreases by 15%. Further, according to stress analysis (operating angle of 46°) on the specification (d), in comparison with the outer race according to the conventional specification in which t=0.02 d is established, in the outer race according to the specification (d) of the present invention, in which t=0.13 d is established, the maximum value of the stress generated on the track groove bottom at the opening end portion decreases by 6%.

Figure 19:
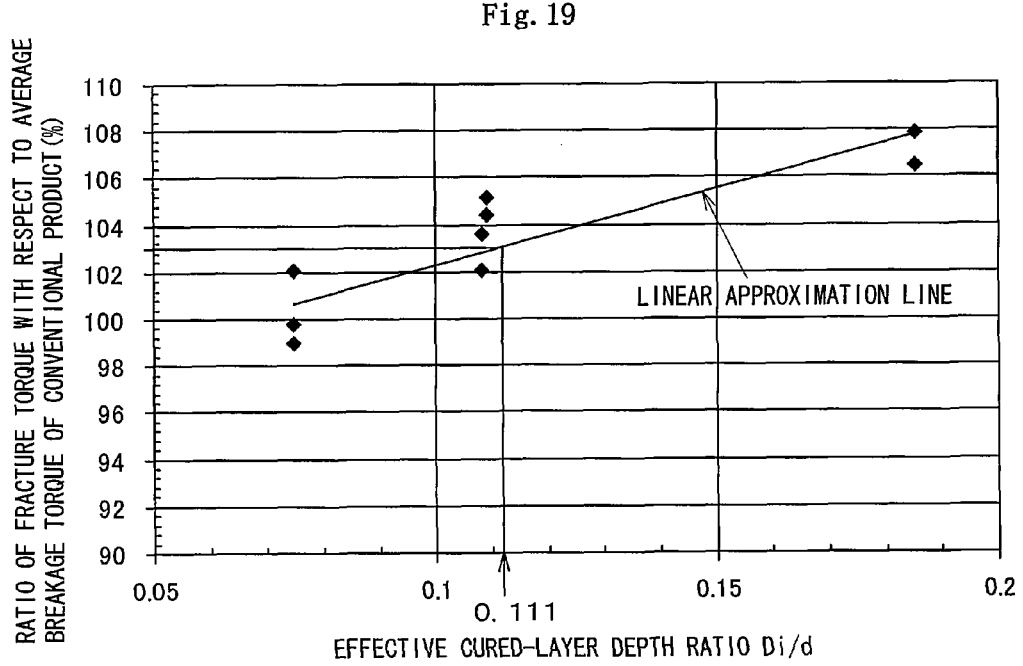
FIG. 19 A graph showing a relationship between a cured-layer depth ratio Di/d of an inner joint member and the results of the rotational torsional strength tests.

FIG. 19 showed the results of the rotation torsional strength tests on test samples according to the invention specification a, specifically, showing a relationship between the effective cured-layer depth ratio Di/d of the inner race and the fracture torque. Here, the fracture torque was represented by a ratio with respect to the average fracture torque of the conventional products according to the conventional specification. When the conventional specification is employed, the fracture torque ratio varies at Di/d of 0.075, specifically, falls within a range of from −1% to +2.1%. When the invention specification is employed, the fracture torque ratio increases by +2.1% to +5.2% at Di/d of from 0.108 to 0.109, and the fracture torque ratio increases by +6.5% to +7.9% at Di/d of 0.185. Based on those results, strength is higher than that of the conventional specification when Di/d is set to be 0.108 or more, but more desirably, sufficient enhancement of strength can be secured when Di/d is set to be 0.111 or more.

Figure 20:
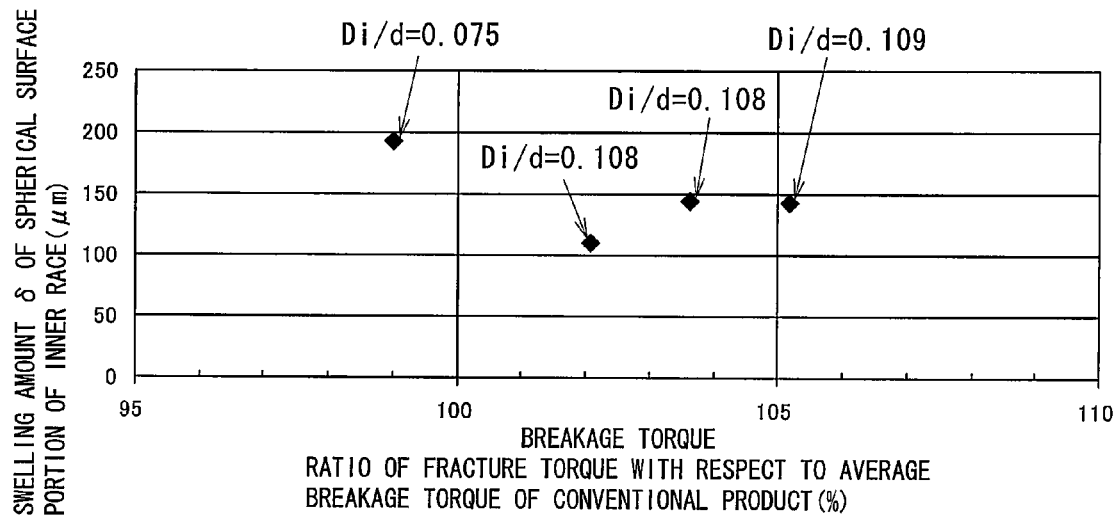
FIG. 20 A graph showing a relationship among the results of the rotational torsional strength tests, a swelling amount of the inner joint member, and a cured-layer depth ratio Di/d of the inner race.
Figure 21:
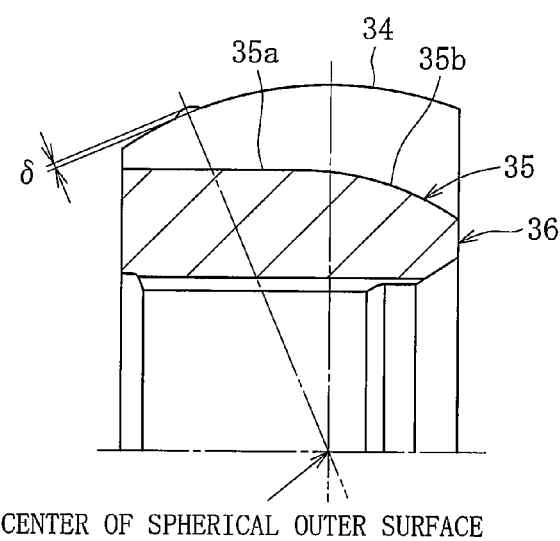
FIG. 21 A sectional view of the inner joint member, illustrating the swelling amount of the inner joint member.

FIG. 20 showed a relationship between the fracture torques of the test samples and a swelling amount (δ) of a spherical surface portion of the inner race (refer to FIG. 21). Here, test samples which were seriously damaged and have cracks formed in a spherical surface of the inner race after the tests were excluded because the swelling amounts of such test samples were not able to be measured. Meanwhile, the swelling amounts were measured at eight points on a spherical surface of each test sample in which cracks were not formed, and comparison is performed based on an average of the δ amounts obtained as a result of the measurement. Note that, a type of damage of all the test samples is cage fracture. δ of the inner race according to the conventional specification at Di/d of 0.075 was 190 μm in spite of low fracture torque. With this, movement of the cage was hindered, and the cage was broken with low torque. The δ amount of the inner races according to the invention specification at Di/d of from 0.108 to 0.109 is large in proportion to the fracture torque. Thus, cage fracture was caused by an influence of the swelling of the spherical surface portion of the inner race and insufficient strength of the cage itself. As can be confirmed from those results, with use of the invention specification, rigidity of the inner race is enhanced, and strength deterioration caused by swelling is suppressed, with the result that strength is enhanced.

INDUSTRIAL APPLICABILITY

The present invention provides a fixed type constant velocity universal joint of the type allowing only angular displacement between the two shafts on the driving side and the driven side, which are coupled to each other. More particularly, the present invention provides a fixed type constant velocity universal joint of the undercut free type, in which each of the bottom surface of the track groove of the outer joint member and the bottom surface of the track groove of the inner joint member comprises the curved portion and the straight portion. The fixed type constant velocity universal joint of the present invention can be used for a drive shaft, a propeller shaft, and a power transmission system for various other industrial machines.

REFERENCE SIGNS LIST 31 inner surface
32, 35 track groove
33a mouth portion
34 outer surface
37 torque transmitting ball
38 cage
40 chamfer
42 opening end surface
44 uncured layer
45 groove bottom

The invention claimed is:

1. A fixed type constant velocity universal joint, comprising:
an outer joint member having an inner surface in which eight track grooves extending in an axial direction are formed;
an inner joint member having an outer surface in which eight track grooves extending in the axial direction are formed;
eight ball tracks formed by cooperation of the eight track grooves of the outer joint member and the eight track grooves of the inner joint member corresponding to the eight track grooves of the outer joint member;
eight torque transmitting balls arranged respectively in the eight ball tracks; and
a cage comprising pockets for respectively holding the eight torque transmitting balls,
the fixed type constant velocity universal joint comprising an undercut free type fixed type constant velocity universal joint, in which a bottom surface of each of the eight track grooves of the outer joint member and a bottom surface of each of the eight track grooves of the inner joint member each comprise a curved portion and a straight portion,
wherein, under a state in which an operating angle of the fixed type constant velocity universal joint is 0°, when a straight line comprising an axial line of the outer joint member and an axial line of the inner joint member is defined as a joint center axial line, and when a plane which comprises respective centers of the eight torque transmitting balls and is orthogonal to the joint center axial line is defined as a joint center plane, a center of each of the eight track grooves of the outer joint member and a center of each of the eight track grooves of the inner joint member are offset respectively to positions spaced apart from the joint center plane respectively toward both axial sides and spaced apart from the joint center axial line respectively toward radially opposite sides with respect to corresponding one of the eight track grooves of the outer joint member and corresponding one of the eight track grooves of the inner joint member, respectively,
wherein a center of a spherical outer surface of the cage is arranged on the center side of each of the eight track grooves of the inner joint member with respect to the joint center plane,
wherein a center of a spherical inner surface of the cage is arranged on the center side of each of the eight track grooves of the outer joint member with respect to the joint center plane,
wherein, when an axial distance from the center of the spherical outer surface of the cage or the center of the spherical inner surface of the cage to the joint center plane is denoted by fc, and when a distance from the center of corresponding one of the eight torque transmitting balls to the joint center axial line is denoted by R, a ratio R2 of fc to R (=fc/R) is 0.01 or less,
wherein, when a distance between the center of each of the eight track grooves of the outer joint member or the center of each of the eight track grooves of the inner joint member and the center of corresponding one of the eight torque transmitting balls is denoted by Rt, and when an axial distance between the center of each of the eight track grooves of the outer joint member or the center of each of the eight track grooves of the inner joint member and the joint center plane is denoted by F, a ratio R1 of F to Rt (=F/Rt) falls within a range of $0.044 \leq R1 \leq 0.087$,
wherein, when a radial offset amount, which is a distance from the center of each of the eight track grooves of the outer joint member or the center of each of the eight track grooves of the inner joint member to the joint center axial line, is denoted by fr, a ratio R3 of fr to Rt (=fr/Rt) falls within a range of $0.07 \leq R3 \leq 0.19$, and
wherein, when an effective cured-layer depth with Hv 513 is denoted by Di and a diameter of each of the eight torque transmitting balls is denoted by d, the bottom surface of each of the eight track grooves of the inner joint member comprises a cured layer with an effective cured-layer depth ratio Di/d of at least 0.111 or more.

2. A fixed type constant velocity universal joint according to claim 1, wherein the ratio R1 of F to Rt (=F/Rt) is set to 0.071 or less.

3. A fixed type constant velocity universal joint according to claim 1, wherein the ratio R3 of fr to Rt (=fr/Rt) is set to 0.15 or more.

4. A fixed type constant velocity universal joint according to claim 1, wherein, when an effective cured-layer depth with Hv 600 is denoted by Dc and the diameter of each of the eight torque transmitting ball is denoted by d, the cage has an effective cured-layer depth ratio Dc/d of at least 0.067 or more, and has an ungrinded surface free from a soft layer having hardness smaller than hardness of a surface of a grinded portion.

5. A fixed type constant velocity universal joint according to claim 1, wherein, along an opening end of the inner surface of the outer joint member, cut portions for inserting the cage are provided at at least two points symmetrical with each other with respect to an axial center.

6. A fixed type constant velocity universal joint according to claim 1, wherein the outer joint member comprises a mouth portion provided with the eight track grooves, the mouth portion comprising a chamfer for allowing formation of an operating angle, the chamfer radially expanding toward an opening side of the outer joint member and being formed at an opening end portion of the mouth portion, wherein, when a projecting amount of the opening end portion of the mouth portion from an intersection of the chamfer and a groove bottom of corresponding one of the eight track grooves of the outer joint member is denoted by t, and when the diameter of each of the eight torque transmitting ball is denoted by d, a relationship of t=0.13 d to 0.185 d is satisfied, and wherein an uncured layer that has not undergone curing treatment exists from the opening end surface of the mouth portion to an outer peripheral surface of the mouth portion, which is continuous with the opening end surface.

7. A fixed type constant velocity universal joint according to claim 1, which is used for coupling of a drive shaft of an automobile.

* * * * *